United States Patent
Hemery et al.

(10) Patent No.: US 12,037,461 B2
(45) Date of Patent: Jul. 16, 2024

(54) ENCAPPED CURABLE POLYORGANOSILOXANES

(71) Applicant: Henkel AG & Co. KGaA, Duesseldorf (DE)

(72) Inventors: Therese Hemery, Wiesbaden (DE); Adrian Duracu, Duesseldorf (DE); Johann Klein, Duesseldorf (DE)

(73) Assignee: Henkel AG & Co. KGaA, Duesseldorf (DE)

(*) Notice: Subject to any disclaimer, the term of this patent is extended or adjusted under 35 U.S.C. 154(b) by 703 days.

(21) Appl. No.: 17/329,449

(22) Filed: May 25, 2021

(65) Prior Publication Data

US 2021/0277242 A1  Sep. 9, 2021

Related U.S. Application Data

(63) Continuation of application No. PCT/EP2019/082324, filed on Nov. 22, 2019.

(30) Foreign Application Priority Data

Nov. 30, 2018 (EP) .................................. 18209567

(51) Int. Cl.
| | | |
|---|---|---|
| C08L 83/06 | (2006.01) | |
| C08F 230/08 | (2006.01) | |
| C08G 77/08 | (2006.01) | |
| C08G 77/16 | (2006.01) | |
| C08G 77/20 | (2006.01) | |
| C08G 77/388 | (2006.01) | |
| C08K 5/29 | (2006.01) | |
| C08K 5/544 | (2006.01) | |
| C08K 5/57 | (2006.01) | |
| C08L 83/04 | (2006.01) | |
| C09J 183/04 | (2006.01) | |

(52) U.S. Cl.
CPC ........ C08G 77/388 (2013.01); C08F 230/085 (2020.02); C08G 77/08 (2013.01); C08G 77/16 (2013.01); C08G 77/20 (2013.01); C08K 5/29 (2013.01); C08K 5/544 (2013.01); C08K 5/57 (2013.01); C08L 83/04 (2013.01); C09J 183/04 (2013.01); C08F 2810/40 (2013.01); C08G 2170/00 (2013.01); C08L 2312/08 (2013.01)

(58) Field of Classification Search
CPC ........ C08L 83/04; C08L 83/06; C08G 77/388
See application file for complete search history.

(56) References Cited

U.S. PATENT DOCUMENTS

| | | | | |
|---|---|---|---|---|
| 3,627,836 A | * | 12/1971 | Getson | C08F 283/122 528/25 |
| 4,434,283 A | | 2/1984 | Sattlegger et al. | |
| 4,511,728 A | * | 4/1985 | Kreuzer | C08K 5/54 556/419 |
| 4,552,942 A | | 11/1985 | Kreuzer et al. | |
| 4,787,439 A | | 11/1988 | Feagin | |
| 4,797,439 A | | 1/1989 | Peccoux | |
| 5,502,096 A | | 3/1996 | Kimura et al. | |
| 8,569,439 B2 | * | 10/2013 | Ederer | C08K 5/5425 252/182.14 |
| 9,481,817 B2 | * | 11/2016 | Pichl | C08K 5/5419 |
| 10,487,096 B2 | * | 11/2019 | Gutacker | C08K 5/544 |
| 10,759,909 B2 | * | 9/2020 | Gutacker | A61F 17/00 |
| 10,954,361 B2 | | 3/2021 | Langerbeins et al. | |
| 11,364,161 B2 | * | 6/2022 | Gutacker | C08G 77/388 |
| 11,873,386 B2 | | 1/2024 | Klein et al. | |
| 2012/0016072 A1 | | 1/2012 | Ederer et al. | |
| 2018/0002353 A1 | | 1/2018 | Gutacker et al. | |
| 2018/0016400 A1 | | 1/2018 | Gutacker et al. | |
| 2020/0115503 A1 | | 4/2020 | Langerbeins et al. | |

FOREIGN PATENT DOCUMENTS

| | | |
|---|---|---|
| DE | 3210337 A1 | 9/1983 |
| EP | 0520426 A1 | 12/1992 |
| EP | 0564253 A1 | 10/1993 |
| EP | 1031611 A1 | 8/2000 |
| EP | 2030976 A1 | 3/2009 |
| EP | 2774672 A1 | 9/2014 |
| EP | 3269723 A1 | 1/2018 |
| EP | 3269785 A1 | 1/2018 |
| EP | 3392313 A1 | 10/2018 |
| JP | 2003342547 A | 12/2003 |
| JP | 2015098557 A | 5/2015 |
| JP | 2021524516 A | 9/2021 |

OTHER PUBLICATIONS

M. M. Sprung, Some α-carbalkoxyalkoxysilanes, J. Org. Chem., 1958, 23 (10), pp. 1530-1534.
International Search Report for International PCT Patent Application No. PCT/EP2019/082324 dated Jan. 20, 2020.
International Search Report for International PCT Patent Application No. PCT/EP2019/082170 dated Jan. 22, 2020.

* cited by examiner

*Primary Examiner* — Margaret G Moore
(74) *Attorney, Agent, or Firm* — James E. Piotrowski

(57) ABSTRACT

The invention relates to curable polyorganosiloxanes with special silicon-containing terminal groups and curable compositions based on these polyorganosiloxanes, a special capped adhesion promoter, and a curing catalyst. These compositions have improved adhesion properties and excellent storage stability. The invention also relates to the use thereof.

17 Claims, No Drawings

ENCAPPED CURABLE POLYORGANOSILOXANES

The invention relates to curable polyorganosiloxanes with special silicon-containing terminal groups and curable compositions based on these polyorganosiloxanes, a special capped adhesion promoter, and a curing catalyst. These compositions have improved adhesion properties and excellent storage stability. The invention also relates to the use thereof.

Polymer systems which possess reactive crosslinkable silyl groups, for example alkoxysilyl groups, have long been known. In the presence of atmospheric moisture these alkoxysilane-terminated polymers are able to condense with elimination of the alkoxy groups. Depending on the amount of alkoxysilane groups and their structure, mainly long-chain polymers (thermoplastics), relatively wide-meshed three-dimensional networks (elastomers) or highly crosslinked systems (thermosets) form.

Silicone polymers (polyorganosiloxanes), particularly polydialkylsiloxanes such as polydimethylsiloxane (PDMS), have great importance in the production of adhesive, sealing, coating, and insulation materials. Among these, those that vulcanize at low temperatures and under ambient conditions constitute a significant share of the market. Typical formulations contain a reactive polyorganosiloxane, in particular a silanol-terminated polyorganosiloxane having at least one, preferably two hydroxy groups bound to a silicon atom. It is typically used in combination with a silane-based crosslinker (silane capping agent) which has hydrolyzable groups bound to the silicon atom. While the polyorganosiloxane and crosslinker can be present as separate components, both can also be reacted with each other to form a modified polyorganosiloxane which can then be used in a curable composition. The term endcapping (end group capping) is also used in this regard. This can be carried out optionally in the presence of a catalyst, whereby the catalyst is to mediate the endcapping selectively without simultaneously curing the polyorganosiloxane.

The uses and possible applications of such silane-terminated polymer systems are equally diverse. They can, for example be used for the production of elastomers, sealants, adhesives, elastic adhesive systems, rigid and flexible foams, a wide variety of coating systems and in the medical field, for example, for impression materials in dentistry. These products can be applied in any form, such as painting, spraying, casting, pressing, filling and the like.

Numerous silane capping agents that act as endcapping or functionalizing moieties for the respective polymer backbone are known in the art. Besides their functionality used for coupling to the polymer backbone, these can be differentiated into acidic, basic, and neutral silane capping agents based on the type of leaving groups released during hydrolysis. Typical acidic silane capping agents contain acid groups as hydrolyzable groups and release the corresponding acids, e.g., acetic acid, during the crosslinking. Typical basic silane capping agents release amines during the crosslinking. In both cases, aggressive compounds are released during the crosslinking, which can corrode or break down, e.g., metals, stone, or mortar, and which moreover have an intense, often unpleasant odor. Neutral crosslinkers are therefore often used for modern curable silicone compositions. Typical representatives of neutral silane capping agents have hydrolyzable groups, which release alcohols or oximes during the crosslinking, such as methanol or ethanol.

Such alkoxy systems nevertheless have the disadvantage that multiple problems arise in the case of the storage stability of relevant curable compositions and the cured products exhibit only poor adhesion to some materials. Oximosilane capping agents, which hydrolyze with the release of an alkanone oxime, usually do not have these disadvantages and are therefore widely used. The most common representative of the oximosilane capping agents releases butan-2-one oxime upon crosslinking. This compound is however suspected of causing cancer so that there is an urgent need for alternative neutral silane capping agents. Apart from that, the released oximes also have an intense, foul odor and working with curable compositions, which contain such silane capping agent, is perceived as disagreeable by the users.

Silane compounds that release α-hydroxycarboxylic acid esters or α-hydroxycarboxylic acid amides during crosslinking, have already been proposed therefore as alternative silane capping agent.

The preparation of suitable silane compounds has been long known and is described, for example, by M. M. Sprung in "Some α-carbalkoxyalkoxysilanes," J. Org. Chem., 1958, 23 (10), pp. 1530-1534.

DE 32 10 337 A1 as well discloses relevant silane compounds and the preparation and use thereof in curable compositions based on polydiorganosiloxanes, which have condensable end groups.

Hardeners for silicone rubber materials, which have three 2-hydroxypropionic acid alkyl ester groups, i.e., lactic acid alkyl ester groups, are known from EP 2 030 976 A1. Vinyl tris(ethyl lactato)silane is particularly preferred in this case.

EP 2 774 672 A1 describes special catalysts for the crosslinking of silicone rubber materials with a crosslinker based on a silane compound with lactate groups. Then again, the crosslinker can be the compounds known from EP 2 030 976 A1. Crosslinkers are also disclosed, however, which have only one, two, or also four 2-hydroxypropionic acid alkyl ester groups.

Although the use of a crosslinker based on a silane compound with lactate groups or similar α-carbalkoxyalkoxy groups is associated with many advantages, the resulting formulations sometimes suffer from only moderate adhesion on certain challenging substrates, such as plastics and concrete. Another challenge is to formulate curable silicone-based compositions containing these crosslinkers that exhibit good storage stability, as the storage stability may decrease specifically in the presence of other conventional and frequently indispensable components of such compositions, particularly of curing catalysts and adhesion promoters as well as the catalysts necessary for the endcapping of the polymers. For example, the typically used catalysts (organic lithium compounds, amines, organic oxides, potassium acetate, organotitanium derivatives, titanium/amine combinations, carboxylic acid/amine combinations, and carbamates and oxime-containing organic compounds) often have disadvantages with respect with to stability, activity or compatibility.

While some formulations that address some of these issues exist, it is an object of the present invention to provide alternative curable compositions based on polyorganosiloxanes which allow the use of crosslinkers, releasing mainly hydroxycarboxylic acid esters—and as possible byproducts hydroxycarboxylic acid amides—during crosslinking, and nevertheless still have a good adhesion and excellent storage stability.

The present invention achieves said object by providing prepolymers (or curable polymers) obtained by condensation of polyorganosiloxanes with a mixture of crosslinkers that release hydroxycarboxylic acid esters and $C_2$-$C_4$ alcohols, preferably ethanol, optionally in the presence of a catalyst. The curable compositions based on these specific polyorganosiloxanes with specific silane groups, that optionally may contain at least one adhesion promoter, exhibit good adhesion on a variety of substrates.

It has been found that the specific endcapped polyorganosiloxanes and their combination with the specific adhesion promoters disclosed herein provides for excellent storage stability and adhesion properties while retaining good curing properties.

In a first aspect, the present invention therefore relates to a (curable) polyorganosiloxane containing at least one terminal group of the formula (I):

$$-A-Si(R^1)_m(R^2)_n(R^3)_{3-(m+n)} \quad (I)$$

wherein:

A is a bond, —O— or a linear, branched or cyclic divalent group selected from hydrocarbon residues having 1 to 12 carbon atoms, alkylene, arylene, oxyalkylene, oxyarylene, siloxane-alkylene, siloxane-arylene, ester, amine, glycol, imide, amide, alcohol, carbonate, urethane, urea, sulfide, ether or a derivative or combination thereof; each $R^1$ is independently selected from the group consisting of hydrogen, halogen, amino, oximino, a substituted or unsubstituted alkyl, alkenyl, alkenyloxy, alkynyl, alkylnyloxy, cycloaliphatic, cycloaliphatic-O—, aryl, aryloxy, heteroaryl, heteroaryloxy, heteroalicyclic, heteroalicyclicoxy, acyl, acyloxy group or a combination thereof; each $R^2$ is independently a group of the general formula (2a) or (2b):

$$-O-Y-COOR^4 \quad (2a)$$

$$-O-(C_{2-4}\ Alkyl) \quad (2b)$$

wherein

Y is a substituted or unsubstituted (hetero)aromatic group having 4 to 14 ring atoms, a substituted or unsubstituted saturated or partially unsaturated 4- to 14-membered (hetero)cyclic group or —(C($R^5$)$_2$)$_o$—;

$R^4$ is a substituted or unsubstituted alkyl, alkenyl, alkynyl, cycloaliphatic, aryl, heteroaryl, and heteroalicyclic group or a combination thereof;

each $R^5$ is independently selected from the group consisting of hydrogen, a substituted or unsubstituted alkyl, alkenyl, alkynyl, cycloaliphatic or aryl group; and o is an integer from 1 to 10; and $C_{2-4}$ Alkyl is ethyl, propyl or butyl, preferably ethyl, n-propyl or n-butyl, more preferably ethyl;

each $R^3$ independently is a group of the general formula (3):

$$-O-Y-CONR^6R^7 \quad (3)$$

wherein

Y is as defined above;

$R^6$ is selected from the group consisting of hydrogen, a substituted or unsubstituted alkyl, alkenyl, alkynyl cycloaliphatic, aryl, heteroaryl, and heteroalicyclic group or a combination thereof or $R^7$;

$R^7$ is a group of the general formula (4):

$$-R^8-SiR^9_p(OR^{10})_{3-p} \quad (4)$$

wherein $R^8$ is an alkylene group, optionally interrupted by a heteroatom, such as O, N, S or Si;

each $R^9$ is independently selected from the group consisting of hydrogen, halogen, amino, a substituted or unsubstituted alkyl, alkenyl, alkynyl, cycloaliphatic, aryl, heteroaryl, and heteroalicyclic group or a combination thereof;

each $R^{10}$ is independently selected from the group consisting of a substituted or unsubstituted alkyl, alkenyl, alkynyl, or acyl group;

each p independently stands for 0, 1, or 2;

m is independently 0, 1 or 2; and n is independently 1, 2, or 3, wherein the sum n+m is a maximum of 3;

with the proviso that the polyorganosiloxane contains at least one terminal group of the formula (I) wherein at least one $R^2$ is a group of formula (2a) and at least one terminal group of the formula (I) wherein at least one $R^2$ is a group of formula (2b), wherein the terminal groups wherein at least one $R^2$ is a group of formula (2a) and at least one $R^2$ is a group of formula (2b) can be the same or different;

wherein said polyorganosiloxane is obtained by reacting a polyorganosiloxane (Ia) having at least one reactive group A', preferably at least one hydroxy group, bound to a silicon atom with at least one compound of formula (Ib)

$$C^a-Si(R^1)_m(R^{2a})_n(R^3)_{3-(m+n)} \quad (Ib)$$

and at least one compound of formula (Ic)

$$C^b-Si(R^1)_m(R^{2b})_n \quad (Ic)$$

wherein $R^{2a}$ is a group of the general formula (2a) and $R^{2b}$ is a group of the general formula (2b), wherein the mass ratio of the compound of formula (Ib) and the compound of formula (Ic) is 95:5 to 5:95, preferably 90:10 to 10:90, more preferably 75:25 to 25:75, most preferably 60:40 to 40:60;

with $C^a$ and $C^b$ being a reactive group that reacts with the at least one reactive group A' bound to a silicon atom to yield the linking group -A-;

m is independently 0, 1 or 2;

n is independently 1, 2, or 3, wherein the sum n+m is a maximum of 3 for the compounds of formula (Ib) and is 3 for the compounds of formula (Ic); and optionally in the presence of a catalyst.

In various embodiments, the catalyst used for obtaining the polyorganosiloxane of the invention comprises, consists essentially of or is an aminosilane, for example a compound of formula (Id)

$$D-R^{11}-SiR^{12}_q(OR^{13})_{3-q} \quad (Id)$$

wherein $R^{11}$ is an alkylene group, optionally interrupted by a heteroatom, preferably $C_1$-$C_{10}$ alkylene, more preferably $C_1$ or $C_3$ alkylene;

each $R^{12}$ is independently selected from the group consisting of hydrogen, halogen, amino, a substituted or unsubstituted alkyl, alkenyl, alkynyl, cycloaliphatic, aryl, heteroaryl, and heteroalicyclic group or a combination thereof;

each $R^{13}$ is independently selected from the group consisting of a substituted or unsubstituted alkyl, alkenyl, alkynyl, or acyl group;

q independently stands for 0, 1, or 2; and

D is a nitrogen-containing group selected from the group of formula (Ie), (If) or (Ig)

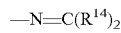  (Ie)

  (If)

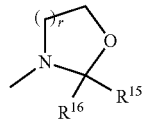  (Ig)

wherein each $R^{14}$ is independently selected from the group consisting of hydrogen, a substituted or unsubstituted alkyl, alkenyl, alkynyl, cycloaliphatic, aryl, heteroaryl, and heteroalicyclic group or a combination thereof;

each $R^{14a}$, $R^{14b}$, $R^{14c}$, $R^{15}$ and $R^{16}$ is independently selected from the group consisting of hydrogen, a substituted or unsubstituted alkyl, alkenyl, alkynyl, cycloaliphatic, aryl, heteroaryl, and heteroalicyclic group or a combination thereof; and r is 1, 2, 3 or 4.

It has been found that the use of a catalyst of formula (Id) may provide for a polyorganosiloxane that has an even higher stability compared to polyorganosiloxanes prepared with conventional catalyst compounds known in the art, such as known aminosilanes. The catalyst is also less sensitive to side reactions and premature consumption.

In another aspect, the invention relates to a curable composition that comprises the curable polyorganosiloxane of the invention. Said composition may further comprise at least one adhesion promoter and/or at least one curing agent. In various embodiments, the curable composition essentially consists of the curable polyorganosiloxane of the invention, the at least one adhesion promoter and the at least one curing agent.

In various embodiments, the curable composition thus comprises (in addition to the curable polyorganosiloxane (A)):

(B) at least one capped adhesion promoter of formula (II):

  (II)

wherein $R^{11}$ is an alkylene group, optionally interrupted by a heteroatom, such as O, N, S or Si, preferably $C_1$-$C_{10}$ alkylene, more preferably $C_1$ or $C_3$ alkylene;

each $R^{12}$ is independently selected from the group consisting of hydrogen, halogen, amino, a substituted or unsubstituted alkyl, alkenyl, alkynyl, cycloaliphatic, aryl, heteroaryl, and heteroalicyclic group or a combination thereof;

each $R^{13}$ is independently selected from the group consisting of a substituted or unsubstituted alkyl, alkenyl, alkynyl, or acyl group;

q independently stands for 0, 1, or 2; and

B is a nitrogen-containing group selected from the group of formula (6), (7), (8) or (9)

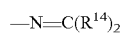  (6)

  (7)

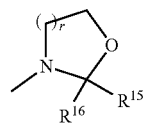  (8)

  (9)

wherein each $R^{14}$, $R^{14a}$, $R^{14b}$, $R^{14c}$, $R^{15}$ and $R^{16}$ is independently selected from the group consisting of hydrogen, a substituted or unsubstituted alkyl, alkenyl, alkynyl, cycloaliphatic, aryl, heteroaryl, and heteroalicyclic group or a combination thereof;

r is 1, 2, 3 or 4;

$R^{17}$ is selected from —Si$(R^{19})_3$;

$R^{18}$ is selected from —Si$(R^{19})_3$, hydrogen, a substituted or unsubstituted alkyl, alkenyl, alkynyl, cycloaliphatic, aryl, heteroaryl, and heteroalicyclic group or a combination thereof; and each $R^{19}$ is independently selected from a substituted or unsubstituted alkyl, alkenyl, alkynyl, cycloaliphatic, or aryl group or a combination thereof; or wherein $R^{17}$ and $R^{18}$ combine to form together with the nitrogen atom to which they are attached a group of formula —Si$(R^{19})_2$—$C_{2-3}$ alkylene-Si$(R^{19})_2$—.

In various embodiments, the curable composition further comprises (in addition to the curable polyorganosiloxane (A) and optionally the adhesion promoter (B)): (C) at least one curing catalyst.

The combination of the polyorganosiloxane endcapped with a silyl group having hydroxycarboxylic acid esters or to a lesser degree hydroxycarboxylic acid amides and $C_2$-$C_4$ alkoxy groups as leaving groups bound to the silicon atom and the adhesion promoter optionally also having a protected amino functionality that only gets released upon contact with moisture/water assures that the curable composition has very high storage stability and cures reliably and at a sufficient rate after application in the presence of atmospheric moisture even at room temperature (23° C.).

The invention further relates to the use of a curable composition of the invention or a curable composition prepared according to the method of the invention as an adhesive, sealing, or coating material.

A "curable composition" is understood to be a substance or mixture of multiple substances, which is curable by physical or chemical measures. In this regard, these chemical or physical measures can be, for example, the supplying of energy in the form of heat, light, or other electromagnetic radiation, but also simply bringing into contact with atmospheric moisture, water, or a reactive component. The composition thereby changes from an original state to a state that has a higher hardness. In the context of the present invention, "curable" predominantly relates to the property of the terminal silane groups of formula (I) to condensate.

Provided reference is made to molecular weights of oligomers or polymers in the present application, the quantities, unless otherwise stated, refer to the weight average, i.e., the Mw value, and not to the number average molecular weight. The molecular weight is determined by gel permeation chromatography (GPC) with tetrahydrofuran (THF) as the eluent according to DIN 55672-1:2007-08, preferably at 35° C. Molecular weights of monomeric compounds are calculated based on the respective molecular formula and the known molecular weights of the individual atoms.

"At least one," as used herein, refers to 1 or more, i.e., 1, 2, 3, 4, 5, 6, 7, 8, 9, or more. In regard to an ingredient, the term relates to the type of ingredient and not to the absolute number of molecules. "At least one polymer" thus means, for example, at least one type of polymer, i.e., that a type of polymer or a mixture of a number of different polymers can be used. Together with weight data, the term refers to all compounds of the given type, contained in the composition/mixture, i.e., that the composition contains no other compounds of this type beyond the given amount of the relevant compounds.

All percentage data, provided in connection with the compositions described herein, refer to % by weight, based in each case on the relevant mixture, unless explicitly indicated otherwise.

"Consisting essentially of", as used herein, means that the respective composition is composed mainly, i.e. by at least 50% by weight, for example at least 60, 70 or 80%, of the referenced component, for example in relation to the curable composition the listed components (A), (B) and (C) and optionally fillers and/or plasticizers, as described below.

"Alkyl," as used herein, refers to a saturated aliphatic hydrocarbon including straight-chain and branched-chain groups. The alkyl group preferably has 1 to 10 carbon atoms (if a numerical range, e.g., "1-10" is given herein, this means that this group, in this case the alkyl group, can have 1 carbon atom, 2 carbon atoms, 3 carbon atoms, etc., up to and including 10 carbon atoms). In particular, the alkyl can be an intermediate alkyl, which has 5 to 6 carbon atoms, or a lower alkyl, which has 1 to 4 carbon atoms, e.g., methyl, ethyl, n-propyl, isopropyl, butyl, isobutyl, tert-butyl, etc. The alkyl groups can be substituted or unsubstituted. "Substituted," as used in this connection, means that one or more carbon atoms and/or hydrogen atom(s) of the alkyl group are replaced by heteroatoms or functional groups. Functional groups that can replace the hydrogen atoms are selected particularly from =O, =S, —OH, —SH, —NH$_2$, —N(C$_{1-10}$ alkyl)$_2$, such as —N(CH$_3$)$_2$, —NO$_2$, —CN, —F, —Cl, —Br, —I, —COOH, —CONH$_2$, —OCN, —NCO, C$_{3-8}$ cycloalkyl, C$_{6-14}$ aryl, a 5-10-membered heteroaryl ring, in which 1 to 4 ring atoms independently are nitrogen, oxygen, or sulfur, and a 5-10-membered heteroalicyclic ring, in which 1 to 3 ring atoms are independently nitrogen, oxygen, or sulfur. Substituted alkyl includes, for example, alkylaryl groups. Heteroalkyl groups in which 1 or more carbon atoms are replaced by heteroatoms, particularly selected from O, S, N, and Si, are obtained by the replacement of one or more carbon atoms by heteroatoms. Examples of such heteroalkyl groups are, without limitation, methoxymethyl, ethoxyethyl, propoxypropyl, methoxyethyl, isopentoxypropyl, ethylaminoethyl, trimethoxypropylsilyl, etc. In various embodiments, substituted alkyl includes C$_{1-10}$ alkyl, preferably C$_{1-4}$ alkyl, such as propyl, substituted with —N(C$_{1-10}$ alkyl)$_2$, preferably N, N-dimethylamino or N, N-diethylamino. In particular embodiments, compound (B), preferably if B is of formula (9), comprises R$^{13}$ moieties that are substituted alkyl, in particular C$_{1-10}$ alkyl, preferably C$_{1-4}$ alkyl, such as propyl, substituted with —N(C$_{1-10}$ alkyl)$_2$, preferably N,N-dimethylamino or N, N-diethylamino.

"Alkenyl," as used herein, refers to an alkyl group, as defined herein, which consists of at least two carbon atoms and at least one carbon-carbon double bond, e.g., ethenyl, propenyl, butenyl, or pentenyl and structural isomers thereof such as 1- or 2-propenyl, 1-, 2-, or 3-butenyl, etc. Alkenyl groups can be substituted or unsubstituted. If they are substituted, the substituents are as defined above for alkyl. "Alkenyloxy" refers to an alkenyl group, as defined herein, that is linked via an —O— to the rest of the molecule. The respective term thus includes enoxy groups, such as vinyloxy (H$_2$C=CH—O—).

"Alkynyl," as used herein, refers to an alkyl group, as defined herein, which consists of at least two carbon atoms and at least one carbon-carbon triple bond, e.g., ethynyl (acetylene), propynyl, butynyl, or petynyl and structural isomers thereof as described above. Alkynyl groups can be substituted or unsubstituted. If they are substituted, the substituents are as defined above for alkyl. "Alkylnyloxy" refers to an alkynyl group, as defined herein, that is linked via an —O— to the rest of the molecule.

A "cycloaliphatic group" or "cycloalkyl group," as used herein, refers to monocyclic or polycyclic groups (a number of rings with carbon atoms in common), particularly of 3-8 carbon atoms, in which the ring does not have a completely conjugated pi-electron system, e.g., cyclopropyl, cyclobutyl, cyclopentyl, cyclohexyl, cyclobutenyl, cyclopentenyl, cyclohexenyl, etc. Cycloalkyl groups can be substituted or unsubstituted. "Substituted," as used in this regard, means that one or more hydrogen atoms of the cycloalkyl group are replaced by functional groups. Functional groups that can replace the hydrogen atoms are selected particularly from =O, =S, —OH, —SH, —NH$_2$, —NO$_2$, —CN, —F, —Cl, —Br, —I, —COOH, —CONH$_2$, —OCN, —NCO, C$_{1-10}$ alkyl or alkoxy, C$_{2-10}$ alkenyl, C$_{2-10}$ alkynyl, C$_{3-8}$ cycloalkyl, C$_{6-14}$ aryl, a 5-10-membered heteroaryl ring, in which 1 to 4 ring atoms independently are nitrogen, oxygen, or sulfur, and a 5-10-membered heteroalicyclic ring, in which 1 to 3 ring atoms independently are nitrogen, oxygen, or sulfur. "Cycloalkyloxy" refers to a cycloalkyl group, as defined herein, that is linked via an —O— to the rest of the molecule.

"Aryl," as used herein, refers to monocyclic or polycyclic groups (i.e., rings that have neighboring carbon atoms in common), particularly of 6 to 14 carbon ring atoms which have a completely conjugated pi-electron system. Examples of aryl groups are phenyl, naphthalenyl, and anthracenyl. Aryl groups can be substituted or unsubstituted. If they are substituted, the substituents are as defined above for cycloalkyl. "Aryloxy" refers to an aryl group, as defined herein, that is linked via an —O— to the rest of the molecule.

A "heteroaryl" group, as used herein, refers to a monocyclic or polycyclic (i.e., rings that share an adjacent ring atom pair) aromatic ring, having particularly 5 to 10 ring atoms, where one, two, three, or four ring atoms are nitrogen, oxygen, or sulfur and the rest is carbon. Examples of heteroaryl groups are pyridyl, pyrrolyl, furyl, thienyl, imidazolyl, oxazolyl, isoxazolyl, thiazolyl, isothiazolyl, pyrazolyl, 1,2,3-triazolyl, 1,2,4-triazolyl, 1,2,3-oxadiazolyl, 1,2, 4-oxadiazolyl, 1,2,5-oxadiazolyl, 1,3,4-oxadiazolyl, 1,3,4-triazinyl, 1,2,3-triazinyl, benzofuryl, isobenzofuryl, benzothienyl, benzotriazolyl, isobenzothienyl, indolyl, isoindolyl, 3H-indolyl, benzimidazolyl, benzothiazolyl, benzoxazolyl, quinolizinyl, quinazolinyl, phthalazinyl, quinoxalinyl, cinnolinyl, naphthyridinyl, quinolyl, isoquinolyl, tetrazolyl, 5,6,7,8-tetrahydroquinolyl, 5,6,7,8-tetrahydroisoquinolyl, purinyl, pteridinyl, pyridinyl, pyrimidinyl, carbazolyl, xanthenyl, or benzoquinolyl. Heteroaryl groups can be substituted or unsubstituted. If they are substituted, the substituents are as defined above for cycloalkyl. "(Hetero) aryl", as used herein, refers to both aryl and heteroaryl groups as defined herein. "Heteroaryloxy" refers to a heteroaryl group, as defined herein, that is linked via an —O— to the rest of the molecule.

A "heteroalicyclic group" or a "heterocycloalkyl group," as used herein, refers to a monocyclic or fused ring having 5 to 10 ring atoms, which contains one, two, or three heteroatoms, selected from N, O, and S, whereby the rest of the ring atoms are carbon. A "heterocycloalkenyl" group contains in addition one or more double bonds. The ring however has no completely conjugated pi-electron system. Examples of heteroalicyclic groups are pyrrolidinone, piperidine, piperazine, morpholine, imidazolidine, tetrahydropyridazine, tetrahydrofuran, thiomorpholine, tetrahydropyridine, and the like. Heterocycloalkyl groups can be substituted or unsubstituted. If they are substituted, the substituents are as defined above for cycloalkyl. "Heteroalicyclic" refers to a heteroalicyclic group, as defined herein, that is linked via an —O— to the rest of the molecule.

The curable polyorganosiloxanes endcapped with silane groups of formula (I) of the invention are obtainable by providing at least one polyorganosiloxane (Ia), which has at least one reactive group A', preferably a hydroxy group, bound to a silicon atom. Preferably, the polyorganosiloxane has at least two such reactive groups A', preferably hydroxy groups, bound to a silicon atom. It is preferred, in addition, that the reactive group(s) are bound to terminal silicon atoms. If the polyorganosiloxane is branched, it preferably has a reactive group A' at each end. Accordingly, while the invention covers polymers that have the silane group of formula (I) only on one end, it is preferred that all polymer chain ends are endcapped by said groups, i.e. a linear polymer would thus have two terminal silane groups. If the polymer is branched, it is preferred that each end is endcapped with the groups of formula (I).

The polyorganosiloxane, which has at least one reactive group A', preferably at least one hydroxy group, bound to a silicon atom, is preferably a polydiorganosiloxane, preferably a polydimethylsiloxane.

Preferably, therefore, an α,ω-dihydroxy-terminated polydiorganosiloxane, particularly an α,ω-dihydroxy-terminated polydimethylsiloxane is used as the polyorganosiloxane (Ia), which has at least one reactive group A' bound to a silicon atom. Particularly preferred are α,ω-dihydroxy-terminated polydimethylsiloxanes, which have a kinematic viscosity at 25° C. of 5000 to 120,000 cSt, particularly 10,000 to 100,000 cSt, and particularly preferably 50,000 to 90,000 cSt.

The curable polyorganosiloxanes of the invention may be linked to the terminal groups of formula (I) via a variety of different linking groups A. In various embodiments, A is a direct covalent bond, —O—, oxyalkylene, such as —O—CH$_2$— or —O—(CH$_2$)$_3$— or a linear or branched divalent group selected from siloxane-alkylene, preferably of the formula —(CH$_2$)$_{1-10}$—(Si(Alk)$_2$-O—Si(Alk)$_2$)$_{1-10}$—(CH$_2$)$_{1-10}$, or a derivative thereof, with Alk being C$_{1-10}$ alkyl, preferably methyl. If A is a siloxane-alkylene of the formula —(CH$_2$)$_{1-10}$—(Si(Alk)$_2$-O—Si(Alk)$_2$)$_{1-10}$ —(CH$_2$)$_{1-10}$, it is preferably selected from —(CH$_2$)$_2$—Si(CH$_3$)$_2$—O—Si(CH$_3$)$_2$—(CH$_2$)$_2$—.

Alternatively, in various embodiments, the curable polyorganosiloxanes of the invention may be linked to the terminal groups of formula (I) via a moiety selected from —O—C(=O)—NH—, —NH—C(=O)O—, —NH—C(=O)—NH—, —NR'—C(=O)—NH—, —NH—C(=O)—NR'—, —NH—C(=O)—, —C(=O)—NH—, —C(=O)—O—, —O—C(=O)—, —O—C(=O)—O—, —S—C(=O)—NH—, —NH—C(=O)—S—, —C(=O)—S—, —S—C(=O)—, —S—C(=O)—S—, —C(=O)—, —S—, —O—, and —NR'—, wherein R' can be hydrogen or a hydrocarbon moiety with 1 to 6 carbon atoms, optionally substituted with halogen, preferably C$_1$-C$_2$ alkyl or hydrogen. In such embodiments, A may consist of the afore-mentioned groups optionally further connected to a bivalent alkylene group having 1 to 10 carbon atoms, optionally interrupted by a heteroatom, that may be substituted, preferably —CH$_2$— or —(CH$_2$)$_3$—. If such alkylene group is present, the orientation is such that the alkylene group connects to the silicon atom of the terminal group of formula (I) while the above-listed functional groups connect to a terminal silicon atom of the polymer chain, i.e. the full linker -A- could be —O—C(=O)—NH—C$_{1-10}$ alkylene- or —O—C$_{1-10}$ alkylene-.

To obtain a polyorganosiloxane of the invention, said polyorganosiloxanes having at least one reactive group A' (Ia) may be reacted with a suitable silane capping agent that yields the desired curable polymer. Generally, said crosslinkers are mixtures of silanes of the formulae (Ib) and (Ic)

$$C^a\text{—Si}(R^1)_m(R^{2a})_n(R^3)_{3-(m+n)} \quad (Ib)$$

$$C^b\text{—Si}(R^1)_m(R^{2b})_n \quad (Ic)$$

wherein R$^{2a}$ is a group of the general formula (2a) and R$^{2b}$ is a group of the general formula (2b), wherein the mass ratio of the compound of formula (Ib) and the compound of formula (Ic) is 95:5 to 5:95, preferably 90:10 to 10:90, more preferably 75:25 to 25:75, most preferably 60:40 to 40:60;

with C$^a$ and C$^b$ each independently being a reactive group that reacts with the at least one reactive group A' bound to a silicon atom to yield the linking group -A-;

m is independently 0, 1 or 2;

n is independently 1, 2, or 3, wherein the sum n+m is a maximum of 3 for the compounds of formula (Ib) and is 3 for the compounds of formula (Ic).

The above-given mass ratio of the compounds of formulae (Ib) and (Ic) ensures that the resulting polyorganosiloxanes comprise terminal groups that have R$^2$ moieties of formula (2a) and (2b). While these different R$^2$ moieties may be on different terminal groups, the polyorganosiloxanes preferably having at least two terminal groups of formula (I), the transesterification reaction that occurs between the terminal groups may result in a percentage of terminal groups that comprise R$^2$ moieties of formula (2a) and (2b) on the same Si atom.

In various embodiments, the reactive group C$^a$ may be a leaving group, preferably a leaving group identical to R$^2$ or R$^3$. In preferred embodiments, C$^a$ is a leaving group that upon reaction with the terminal reactive group A' of the polyorganosiloxane (Ia) yields the linker group -A-.

In various embodiments, C$^a$ is a group of the general formula (2a)

$$\text{—O—Y—COOR}^4 \quad (2a)$$

wherein Y and R$^4$ are as defined above.

In various embodiments thereof, Y is a substituted or unsubstituted (hetero)aromatic group having 4 to 14 ring atoms, a substituted or unsubstituted saturated or partially unsaturated 4- to 14-membered (hetero)cyclic group or —C(R$^5$)$_2$)$_o$—;

R$^4$ is a substituted or unsubstituted alkyl, alkenyl, alkynyl, cycloaliphatic, aryl, heteroaryl, and heteroalicyclic group or a combination thereof;

each R$^5$ is independently selected from the group consisting of hydrogen, a substituted or unsubstituted alkyl, alkenyl, alkynyl, cycloaliphatic or aryl group; and o is an integer from 1 to 10, preferably 1 to 5, more preferably 1 or 2.

In various embodiments of C$^a$ being a group of formula (2a), R$^4$ stands for a substituted or unsubstituted alkyl group having 1 to 10 carbon atoms, particularly having 1 to 4 carbon atoms, particularly preferably methyl or ethyl. In some embodiments, Y is a substituted or unsubstituted aromatic group having 6 carbon ring atoms, preferably 1,2-phenylene, or —(C($R^5$)$_2$)$_o$—, wherein o is 1 and one of the $R^5$ groups is hydrogen and the second $R^5$ group is a substituted or unsubstituted alkyl group having 1 to 10 carbon atoms, particularly methyl, carboxymethyl or an (alkyl) ester thereof, such as ethylcarboxymethyl.

$C^a$ may thus be a group derived from a hydroxycarboxylic acid ester, such as lactate, malate or salicylate. In such embodiments of $C^a$, Y is CHCH$_3$ or CHCH$_2$COOR$^4$ or 1,2-phenylene (C$_6$H$_4$) and $R^4$ is alkyl, preferably ethyl or methyl, more preferably ethyl. In such embodiments, upon reaction with the reactive group A', the lactate, malate or salicylate group is replaced by -A-.

In various embodiments, the reactive group $C^b$ may be a leaving group, preferably a leaving group of the general formula (2b)

$$—O—(C_{2\text{-}4}\text{ alkyl}) \qquad (2b)$$

wherein $C_{2\text{-}4}$ alkyl is as defined above, preferably ethyl.

In various embodiments, A' is a nucleophilic group, preferably hydroxy. If A' is hydroxy, it is preferred that $C^a$ and/or $C^b$ are selected such that upon reaction with A', the group —O— is formed.

In general, suitable (condensation) reactions are known and are also called endcapping. These may, according to the invention, be carried out in the presence of a catalyst. This catalyst may, in various embodiments, be a specific catalyst of formula (Id), whereby the catalyst is to mediate the endcapping selectively without simultaneously curing the polyorganosiloxane.

Said catalyst can be a compound of formula (Id)

$$D\text{-}R^{11}—SiR^{12}{}_q(OR^{13})_{3\text{-}q} \qquad (Id)$$

wherein
$R^{11}$ is an alkylene group, optionally interrupted by a heteroatom, preferably C$_1$-C$_{10}$ alkylene, more preferably C$_1$ or C$_3$ alkylene;
each $R^{12}$ is independently selected from the group consisting of hydrogen, halogen, amino, a substituted or unsubstituted alkyl, alkenyl, alkynyl, cycloaliphatic, aryl, heteroaryl, and heteroalicyclic group or a combination thereof;
each $R^{13}$ is independently selected from the group consisting of a substituted or unsubstituted alkyl, alkenyl, alkynyl, or acyl group;
q independently stands for 0, 1, or 2; and
D is a nitrogen-containing group selected from the group of formula (Ie), (If) or (Ig)

$$—N\!=\!C(R^{14})_2 \qquad (Ie)$$

$$—NR^{14a}—CR^{14b}\!=\!C(R^{14c})_2 \qquad (If)$$

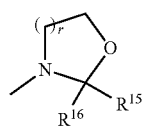

(Ig)

wherein each $R^{14}$ is independently selected from the group consisting of hydrogen, a substituted or unsubstituted alkyl, alkenyl, alkynyl, cycloaliphatic, aryl, heteroaryl, and heteroalicyclic group or a combination thereof;
each $R^{14a}$, $R^{14b}$, $R^{14c}$, $R^{15}$ and $R^{16}$ is independently selected from the group consisting of hydrogen, a substituted or unsubstituted alkyl, alkenyl, alkynyl, cycloaliphatic, aryl, heteroaryl, and heteroalicyclic group or a combination thereof; and
r is 1, 2, 3 or 4.

In various embodiments, the catalyst (Id) is a compound wherein q is 0 or 1, preferably 0.

$R^{13}$ can be an unsubstituted alkyl group, preferably a C$_{1\text{-}3}$ alkyl group, more preferably methyl or ethyl.

In various embodiments of said catalyst, $R^{11}$ is C$_1$ to C$_6$ alkylene, which may be branched or linear, preferably C$_1$ or C$_3$ alkylene, more preferably propylene.

In various embodiments, D is the group of formula (Ie) and one $R^{14}$ is hydrogen and the other is unsubstituted alkyl, preferably C$_{1\text{-}4}$ alkyl, such as methyl, ethyl, propyl or butyl, including isopropyl and isobutyl.

In various other embodiments, D is the group of formula (If) and each of $R^{14b}$ and $R^{14c}$ is hydrogen or unsubstituted alkyl, preferably C$_{1\text{-}4}$ alkyl, such as methyl, ethyl, propyl or butyl, including isopropyl and isobutyl. In such embodiments, $R^{14a}$ may be hydrogen. If none of $R^{14a}$, $R^{14b}$ and $R^{14c}$ is hydrogen, it can be preferred that at least one of these residues comprises a CH moiety in alpha-position to the carbon/nitrogen atom to which it is attached.

In various embodiments, if in the group of formula (Ie) both $R^{14}$ are not hydrogen, and at least one $R^{14}$ comprises a C—H moiety in alpha-position to the carbon atom to which it is attached.

In various embodiments, r in the group of formula (Ig) is 1, 2, 3 or 4, preferably 1 or 2.

The catalyst (Id) may be used in any amount suitable to ensure adequate formation of the desired polyorganosiloxane of formula (I). Typical amounts range from 0.05 to 1.5%, preferably 0.1 to 1.0 or 0.2 to 0.8% by weight relative to the total amount of polyorganosiloxane (Ia) and the compounds of formulae (Ib) and (Ic).

In the following, various embodiments of the endcapped curable polyorganosiloxane obtained by reacting a polyorganosiloxane (Ia) with compounds of formulae (Ib) and (Ic) optionally in the presence of a catalyst of formula (Id) are described.

In various embodiments of the endcapping group of formula (I), each $R^1$ independently stands for a substituted or unsubstituted alkyl, alkenyl, or alkynyl group; a substituted or unsubstituted cycloaliphatic group or aryl group; or a substituted or unsubstituted heteroalicyclic group or heteroaryl group. Alternatively or additionally, one or more $R^1$ may represent hydrogen, halogen, amino, oximino, alkenyloxy, alkylnyloxy, cycloaliphatic-O—, aryloxy, heteroaryloxy, heteroalicyclicoxy, acyl, acyloxy or a combination thereof.

In various embodiments, each $R^1$ independently of one another stands for an alkyl group having 1 to 10 carbon atoms, particularly methyl, ethyl, propyl, or isopropyl, for an alkenyl group having 2 to 10 carbon atoms, particularly vinyl or allyl, or an aryl group having 6 to 10 carbon atoms, particularly phenyl, or an aryloxy group having 6 to 14 carbon atoms, or an acyloxy group having 2 to 10 carbon atoms, preferably acetoxy, oximino, alkenyloxy having 2 to 10 carbon atoms, or amino.

In specific embodiments, each $R^1$ independently represents methyl, vinyl, or phenyl, particularly preferred are methyl and vinyl.

In formula (I), each $R_2$ independently represents a group of the general formula (2a) or (2b):

$$-O-Y-COOR^4 \qquad (2a)$$

$$-O-(C_{2\text{-}4} \text{ Alkyl}) \qquad (2b)$$

wherein

Y is a substituted or unsubstituted (hetero)aromatic group having 4 to 14 ring atoms, a substituted or unsubstituted saturated or partially unsaturated 4- to 14-membered (hetero)cyclic group or $-(C(R^5)_2)_o-$;

$R^4$ is a substituted or unsubstituted alkyl, alkenyl, alkynyl, cycloaliphatic, aryl, heteroaryl, and heteroalicyclic group or a combination thereof;

each $R^5$ is independently selected from the group consisting of hydrogen, a substituted or unsubstituted alkyl, alkenyl, alkynyl, cycloaliphatic or aryl group; and o is an integer from 1 to 10; and $C_{2\text{-}4}$ Alkyl is ethyl, propyl or butyl, preferably ethyl, n-propyl or n-butyl, more preferably ethyl.

In various embodiments, at least one or all $R^2$ of a given terminal group of formula (I) independently of one another stand for a group of the formula (2a), wherein $R^4$ stands for a substituted or unsubstituted alkyl group having 1 to 10 carbon atoms, particularly having 1 to 4 carbon atoms, particularly preferably methyl or ethyl. In some embodiments, Y is a substituted or unsubstituted aromatic group having 6 carbon ring atoms, preferably 1,2-phenylene, or $-(C(R^5)_2)_o-$, wherein o is 1 and one of the $R^5$ groups is hydrogen and the second $R^5$ group is a substituted or unsubstituted alkyl group having 1 to 10 carbon atoms, particularly methyl, carboxymethyl or an (alkyl) ester thereof, such as ethylcarboxymethyl.

In various embodiments, at least one or all $R^2$ of a given terminal group of formula (I) independently of one another stand for a lactic acid ester, preferably the ethyl ester, or a malic acid mono- or diester, preferably the mono- or diethyl ester.

In other embodiments, at least one or all $R^2$ of a given terminal group of formula (I) are derived from salicylic acid, i.e. Y is 1,2-phenylene. The salicylic acid residue is an ester, for example the methyl or ethyl ester, preferably the ethyl ester.

In various embodiments, at least one or all $R^2$ of a given terminal group of formula (I) independently of one another stand for a group of the formula (2b), wherein the group of formula (2b) is preferably ethoxy.

In various embodiments, each $R^3$ independently of one another stands for a group of the general formula (3):

$$-O-Y-CONR^6R^7 \qquad (3)$$

In various embodiments, Y is as defined above; $R^6$ is selected from the group consisting of hydrogen, a substituted or unsubstituted alkyl, alkenyl, alkynyl cycloaliphatic, aryl, heteroaryl, and heteroalicyclic group or a combination thereof or $R^7$; and $R^7$ is a group of the general formula (4):

$$-R^8-SiR^9_p(OR^{10})_{3-p} \qquad (4)$$

wherein $R^8$ is an alkylene group, optionally interrupted by a heteroatom, such as O, N, S or Si, preferably a $C_{1\text{-}10}$ or $C_{1\text{-}8}$ alkylene group, more preferably a $C_1$-$C_3$ alkylene group, most preferably a methylene ($CH_2$) or propylene (($CH_2$)$_3$) group;

each $R^9$ is independently selected from the group consisting of hydrogen, halogen, amino, a substituted or unsubstituted alkyl, alkenyl, alkynyl, cycloaliphatic, aryl, heteroaryl, and heteroalicyclic group or a combination thereof;

each $R^{10}$ is independently selected from the group consisting of a substituted or unsubstituted alkyl, alkenyl, alkynyl, or acyl group, preferably unsubstituted lower alkyl, more preferably methyl or ethyl; and each p independently stands for 0, 1, or 2, preferably 0 or 1, more preferably 0.

In various embodiments, in the groups of formula (3) the Y is as defined for the group of formula (2a) above, i.e. Y is a substituted or unsubstituted aromatic group having 6 carbon ring atoms, preferably 1,2-phenylene, or $-(C(R^5)_2)_o-$, wherein o is 1 and one of the $R^5$ groups is hydrogen and the second $R^5$ group is a substituted or unsubstituted alkyl group having 1 to 10 carbon atoms, particularly methyl, carboxymethyl or an (alkyl) ester thereof, such as ethylcarboxymethyl.

In various embodiments, $R^6$ preferably stands for hydrogen, a substituted or unsubstituted alkyl group having 1 to 10 carbon atoms, preferably an unsubstituted alkyl group having 1 to 10 carbon atoms, more preferably having 1 to 6 carbon atoms, even more preferably unsubstituted alkyl having 1 to 4 carbon atoms or hydrogen.

In various embodiments, $R^8$ preferably is an alkylene group of the formula $-(CH_2)_{1\text{-}8}-$, more preferably $-(CH_2)_{1\text{-}5}-$, even more preferably $-(CH_2)_{1\text{-}3}-$, most preferably $-CH_2-$ or $-(CH_2)_3-$.

In various embodiments, each $R^9$ independently of one another preferably stands for a substituted or unsubstituted alkyl group having 1 to 10 carbon atoms, preferably an unsubstituted alkyl group having 1 to 10 carbon atoms, particularly having 1 to 4 carbon atoms, particularly preferably methyl or ethyl.

In various embodiments, each $R^{10}$ independently of one another preferably stands for a substituted or unsubstituted alkyl group having 1 to 10 carbon atoms, preferably an unsubstituted alkyl group having 1 to 10 carbon atoms, particularly having 1 to 4 carbon atoms, particularly preferably methyl or ethyl, most preferably methyl.

Preferably each $R^3$ independently of one another stands for a group of the formula (3), wherein Y is a substituted or unsubstituted aromatic group having 6 carbon ring atoms, preferably 1,2-phenylene, or $-C(R^5)_2)_o-$, wherein o is 1 and one of the $R^5$ groups is hydrogen and the second $R^5$ group is a substituted or unsubstituted alkyl group having 1 to 10 carbon atoms, particularly methyl, carboxymethyl or an (alkyl) ester thereof, $R^6$ represents hydrogen, a substituted or unsubstituted alkyl group having 1 to 10 carbon atoms, particularly having 1 to 4 carbon atoms, and $R^7$ represents a group of the formula (4), where $R^8$ is a $C_{1\text{-}10}$ alkylene group, preferably a $C_1$ or $C_3$ alkylene group, each $R^9$ independently of one another stands for a substituted or unsubstituted alkyl group having 1 to 10 carbon atoms, particularly having 1 to 4 carbon atoms, particularly preferably methyl or ethyl, and each $R^{10}$ independently of one another stands for a substituted or unsubstituted alkyl group having 1 to 10 carbon atoms, particularly having 1 to 4 carbon atoms, particularly preferably methyl or ethyl; and p is 0 or 1, preferably 0.

In various embodiments, n and m in formula (1) are selected so that the sum n+m is 3. In various embodiments, n may be 2 or 3, preferably 2. In various embodiments, n may be 2 or 3 and m may be 0 or 1, preferably n is 2 and m is 1.

In embodiments, where m+n=3, the silane groups of the formula (1) contain no $R^3$ group, i.e., no hydroxycarboxylic acid amide group.

In various embodiments, the polyorganosiloxane comprises (a) at least one terminal group of formula (I) with m being 0 and n being 3 or m being 1 and n being 2, preferably m being 1 and n being 2, wherein each $R^1$ independently of one another stands for an alkyl group having 1 to 10 carbon atoms, particularly methyl, ethyl, propyl, or isopropyl, for an alkenyl group having 2 to 10 carbon atoms, particularly vinyl or allyl, or an aryl group having 6 to 10 carbon atoms, particularly phenyl, or an aryloxy group having 6 to 14 carbon atoms, or an acyloxy group having 2 to 10 carbon atoms, preferably acetoxy, oximino, alkenyloxy having 2 to 10 carbon atoms, or amino, most preferably $R^1$ being vinyl; and at least one, preferably 2 or all $R^2$ stand for a group of the formula (2a), wherein $R^4$ stands for a substituted or unsubstituted alkyl group having 1 to 10 carbon atoms, particularly having 1 to 4 carbon atoms, particularly preferably methyl or ethyl, and Y is a substituted or unsubstituted aromatic group having 6 carbon ring atoms, preferably 1,2-phenylene, or $—(C(R^5)_2)_o—$, wherein o is 1 and one of the $R^5$ groups is hydrogen and the second $R^5$ group is a substituted or unsubstituted alkyl group having 1 to 10 carbon atoms, particularly methyl, carboxymethyl or an (alkyl) ester thereof, wherein at least one $R^2$, if not a group of the formula (2a), stands for a group of the formula (2b), preferably ethoxy; and (b) at least one terminal group of formula (I) with m being 0 and n being 3 or m being 1 and n being 2, preferably m being 1 and n being 2, wherein each $R^1$ independently of one another stands for an alkyl group having 1 to 10 carbon atoms, particularly methyl, ethyl, propyl, or isopropyl, for an alkenyl group having 2 to 10 carbon atoms, particularly vinyl or allyl, or an aryl group having 6 to 10 carbon atoms, particularly phenyl, or an aryloxy group having 6 to 14 carbon atoms, or an acyloxy group having 2 to 10 carbon atoms, preferably acetoxy, oximino, alkenyloxy having 2 to 10 carbon atoms, or amino, most preferably $R^1$ being vinyl; and at least one, preferably 2 or all $R^2$ stand for a group of the formula (2b), preferably ethoxy, wherein at least one $R^2$, if not a group of the formula (2b), stands for a group of the formula (2a), wherein $R^4$ stands for a substituted or unsubstituted alkyl group having 1 to 10 carbon atoms, particularly having 1 to 4 carbon atoms, particularly preferably methyl or ethyl, and Y is a substituted or unsubstituted aromatic group having 6 carbon ring atoms, preferably 1,2-phenylene, or $—(C(R^5)_2)_o—$, wherein o is 1 and one of the $R^5$ groups is hydrogen and the second $R^5$ group is a substituted or unsubstituted alkyl group having 1 to 10 carbon atoms, particularly methyl, carboxymethyl or an (alkyl) ester thereof.

In various embodiments, the polyorganosiloxane comprises (a) at least one first terminal group of formula (I) with m being 0 and n being 3 or m being 1 and n being 2, preferably m being 1 and n being 2, wherein each $R^1$ independently of one another stands for an alkyl group having 1 to 10 carbon atoms, particularly methyl, ethyl, propyl, or isopropyl, for an alkenyl group having 2 to 10 carbon atoms, particularly vinyl or allyl, most preferably $R^1$ being methyl, ethyl or vinyl; and all $R^2$ stand for a group of the formula (2a), wherein $R^4$ stands for a substituted or unsubstituted alkyl group having 1 to 10 carbon atoms, particularly having 1 to 4 carbon atoms, particularly preferably methyl or ethyl, and Y is a substituted or unsubstituted aromatic group having 6 carbon ring atoms, preferably 1,2-phenylene, or $—(C(R^5)_2)_o—$, wherein o is 1 and one of the $R^5$ groups is hydrogen and the second $R^5$ group is a substituted or unsubstituted alkyl group having 1 to 10 carbon atoms, particularly methyl, carboxymethyl or an (alkyl) ester thereof; and (b) at least one second terminal group of formula (I) with m being 0 and n being 3 or m being 1 and n being 2, preferably m being 1 and n being 2, wherein each $R^1$ independently of one another stands for an alkyl group having 1 to 10 carbon atoms, particularly methyl, ethyl, propyl, or isopropyl, for an alkenyl group having 2 to 10 carbon atoms, particularly vinyl or allyl, most preferably $R^1$ being methyl, ethyl or vinyl; and all $R^2$ stand for a group of the formula (2b), preferably ethoxy.

In the afore-mentioned embodiments, wherein at least one terminal group of formula (I) comprises only $R^2$ residues that are of formula (2a) and one other terminal group of formula (I) on the same or different polyorganosiloxane comprises only $R^2$ residues that are of formula (2b), such polyorganosiloxanes are obtainable by using a mixture of crosslinking agents of formulae (Ib) and (Ic). In various embodiments, such polyorganosiloxanes can however undergo a transesterification reaction that leads to terminal groups of formula (I) that comprise $R^2$ groups of formula (2a) and (2b).

Preferred silane groups of the formula (I) are, in various embodiments, selected from methyl bis(ethyl lactato)silane, ethyl bis(ethyl lactato)silane, phenyl bis(ethyl lactato)silane, vinyl bis(ethyl lactato)silane, tri(ethyl lactato)silane, methyl bis(ethyl salicylato)silane, ethyl bis(ethyl salicylato)silane, phenyl bis(ethyl salicylato)silane, vinyl bis(ethyl salicylato) silane, tri(ethyl salicylato)silane, methyl bis(diethyl malato) silane, ethyl bis(diethyl malato)silane, phenyl bis(diethyl malato)silane, vinyl bis(diethyl malato)silane, tri(diethyl malato)silane and mixtures thereof. Further preferred silane groups of formula (I) are selected from methyl diethoxysilane, ethyl diethoxysilane, phenyl diethoxysilane, vinyl diethoxysilane, triethoxysilane, and mixtures thereof. In still further embodiments, the silane groups of formula (I) may be selected from methyl ethyl lactate ethoxy silane, ethyl lactate ethoxy silane, phenyl ethyl lactate ethoxy silane, vinyl ethyl lactate ethoxy silane, bis(ethyl lactato) ethoxy silane, methyl ethyl salicylate ethoxy silane, ethyl salicylate ethoxy silane, phenyl ethyl salicylate ethoxy silane, vinyl ethyl salicylate ethoxy silane, bis(ethyl salicylato) ethoxy silane, methyl diethyl malato ethoxy silane, ethyl diethyl malato ethoxy silane, phenyl diethyl malato ethoxy silane, vinyl diethyl malato ethoxy silane, bis(diethyl malato) ethoxy silane and mixtures thereof. In various embodiments, the polyorganosiloxane comprises at least two terminal groups of formula (I) and the groups $Si(R^1)_m(R^2)_n(R^3)_{3-(m+n)}$ in the terminal groups of formula (I) comprise at least two groups selected from those listed above.

In further embodiments, n and m in formula (I) are selected such that the sum n+m is 2. In this case, the silane of the formula (I) contains at least one $R^3$ group, i.e., at least one hydroxycarboxylic acid amide group. Preferred silanes of the formula (I) in this case are selected from compounds, which are obtained by the selective amidation of methyl bis(ethyl lactato)silane, ethyl bis(ethyl lactato)silane, phenyl bis(ethyl lactato)silane, vinyl bis(ethyl lactato)silane, tri(ethyl lactato)silane, methyl bis(ethyl salicylato)silane, ethyl bis(ethyl salicylato)silane, phenyl bis(ethyl salicylato)silane, vinyl bis(ethyl salicylato)silane, tri(ethyl salicylato)silane, methyl bis(diethyl malato)silane, ethyl bis(diethyl malato)silane, phenyl bis(diethyl malato)silane, vinyl bis(diethyl malato)silane, tri(diethyl malato)silane, and mixtures thereof or the other groups comprising hydroxycarboxylic acid groups listed above with an amine of the formula (5):

where
p, $R^6$, $R^8$, $R^9$ and $R^{10}$, in each case independently of one another, have the aforesaid general, preferred, and particularly preferred meanings. Particularly preferably, this concerns an amidation product of methyl bis(ethyl lactato)silane, ethyl bis(ethyl lactato)silane, phenyl bis(ethyl lactato)silane, vinyl bis(ethyl lactato)silane, tri(ethyl lactato)silane, methyl bis(ethyl salicylato)silane, ethyl bis(ethyl salicylato)silane, phenyl bis(ethyl salicylato)silane, vinyl bis(ethyl salicylato)silane, tri(ethyl salicylato)silane, methyl bis(diethyl malato)silane, ethyl bis(diethyl malato)silane, phenyl bis(diethyl malato)silane, vinyl bis(diethyl malato)silane, tri(diethyl malato)silane, and mixtures thereof with 3-aminopropyltrimethoxysilane and/or 3-aminopropyltriethoxysilane.

In various embodiments, the curable compositions of the invention contain the polyorganosiloxane (A) in an amount of 32 to 97% by weight, particularly preferably in an amount of 40 to 70% by weight, based in each case on the total weight of the composition. If a mixture of polyorganosiloxanes is used, the amounts relate to the total amount of polyorganosiloxanes in the composition. If such a mixture is used, only one of the polyorganosiloxanes may be a polyorganosiloxane of the invention. It is however preferred that essentially all, i.e., at least 50 wt.-%, preferably at least 70 or 80 wt.-%, of the polyorganosiloxanes used in the composition are those described herein.

The curable compositions may contain as component (B) at least one adhesion promoter. Adhesion promoters useful for polyorganosiloxane compositions are known in the art and may be selected by those skilled in the art based on their common general knowledge and by routine considerations.

The composition described herein can contain up to about 20% by weight of conventional adhesion promoters (tackifiers). Suitable as adhesion promoters are, for example, resins, terpene oligomers, coumarone/indene resins, aliphatic petrochemical resins, and modified phenol resins. Suitable within the context of the present invention are, for example, hydrocarbon resins, as can be obtained by polymerization of terpenes, primarily α- or β-pinene, dipentene, or limonene. These monomers are generally polymerized cationically with initiation using Friedel-Crafts catalysts. The terpene resins also include, for example, copolymers of terpenes and other monomers, for example, styrene, α-methylstyrene, isoprene, and the like. The aforesaid resins are used, for example, as adhesion promoters for contact adhesives and coating materials. Also suitable are terpene-phenol resins, which are prepared by the acid-catalyzed addition of phenols to terpenes or rosin. Terpene-phenol resins are soluble in most organic solvents and oils and miscible with other resins, waxes, and natural rubber. Also suitable as an additive in the aforesaid sense within the context of the present invention are the rosin resins and derivatives thereof, for example, the esters thereof.

Also suitable are silane adhesion promoters, particularly alkoxysilanes, with a (further) functional group such as, e.g., an amino group, a mercapto group, an epoxy group, a carboxyl group, a vinyl group, an isocyanate group, an isocyanurate group, or a halogen. Examples are γ-mercaptopropyltrimethoxysilane, γ-mercaptopropyltriethoxysilane, γ-mercaptopropylmethyldimethoxysilane, γ-glycidoxypropyltrimethoxysilane, γ-glycidoxypropyltriethoxysilane, γ-glycidoxypropylmethyldimethoxysilane, β-carboxyethyltriethoxysilane, β-carboxyethylphenylbis(2-methoxyethoxy)silane, N-β-(carboxymethyl)aminoethyl-γ-aminopropyltrimethoxysilane, vinyltrimethoxysilane, vinyltriethoxysilane, γ-acroyloxypropylmethyltriethoxysilane, γ-isocyanato-propyltrimethoxysilane, γ-isocyanatopropyltriethoxysilane, γ-isocyanatopropylmethyldiethoxysilane, γ-isocyanatopropylmethyldimethoxysilane, tris(trimethoxysilyl)isocyanurate, and γ-chloropropyltrimethoxysilane.

In various embodiments, the adhesion promoter may be selected from the group consisting of aminosilanes, more preferably from the group consisting of 3-aminopropyltrimethoxysilane, 3-aminopropyltriethoxysilane, aminomethyltrimethoxysilane, aminomethyltriethoxysilane, 3-aminopropylmethyldiethoxysilane, (N-2-aminoethyl)-3-aminopropyltrimethoxysilane, (N-2-aminoethyl)-3-aminopropyltriethoxysilane, diethylenetriaminopropyltrimethoxysilane, phenylaminomethyltrimethoxysilane, (N-2-aminoethyl)-3-aminopropylmethyldimethoxysilane, 3-(N-phenylamino)propyltrimethoxysilane, 3-piperazinylpropylmethyldimethoxysilane, 3-(N,N-dimethylaminopropyl)aminopropylmethyldimethoxysilane, tri[(3-triethoxysilyl)propyl]amine, tri[(3-trimethoxysilyl)propyl]amine, and the oligomers thereof, 3-(N,N-dimethylamino)propyltrimethoxysilane, 3-(N,N-dimethylamino)-propyltriethoxysilane, (N,N-dimethylamino)methyltrimethoxysilane, (N,N-dimethylamino)methyltriethoxysilane, 3-(N,N-diethylamino)propyltrimethoxysilane, 3-(N,N-diethylamino)propyltriethoxysilane, (N,N-diethylamino)methyltrimethoxysilane, (N,N-diethylamino)methyltriethoxysilane, bis(3-trimethoxysilyl)propylamine, bis(3-triethoxysilyl)propylamin, 4-amino-3,3-dimethylbutyltrimethoxy silane and 4-amino-3,3-dimetylbuthyltriethoxy silane and mixtures thereof, particularly preferably of 3-aminopropyltriethoxysilane, aminomethyltriethoxysilane, 3-(N,N-dimethylamino)propyltriethoxysilane, (N,N-dimethylamino)methyltriethoxysilane, 3-(N,N-diethylamino)propyltriethoxysilane, (N,N-diethylamino)methyltriethoxysilane, 4-amino-3,3-dimetylbuthyltriethoxy silane and bis(3-triethoxysilyl)propylamine, In various embodiments, the compositions of the invention comprise at least one aminosilane as described above, in particular one of the tertiary aminosilanes. "Tertiary aminosilane", as used herein, refers to an aminosilane wherein the nitrogen atom of the amino group is covalently linked to three non-hydrogen residues. In various embodiments, the aminosilane is selected from the group consisting of tri[(3-triethoxysilyl)propyl]amine, and the oligomers thereof, 3-(N,N-dimethylamino)-propyltriethoxysilane, (N,N-dimethylamino)methyltriethoxysilane, 3-(N,N-diethylamino)-propyltriethoxysilane, (N,N-diethylamino)methyltrimethoxysilane, bis(3-triethoxysilyl)propylamin, and mixtures thereof, particularly preferably of 3-(N,N-dimethylamino)propyltriethoxysilane, (N,N-dimethylamino)methyltriethoxysilane, 3-(N,N-diethylamino)propyltriethoxysilane, and (N,N-diethylamino)methyltrimethoxysilane.

In various preferred embodiments, the adhesion promoter used may be a capped adhesion promoter of formula (II):

$$B-R^{11}-SiR^{12}{}_q(OR^{13})_{3-q} \quad (II)$$

wherein

R$^{11}$ is an alkylene group, optionally interrupted by a heteroatom, such as O, N, S or Si, preferably C$_1$-C$_{10}$ alkylene, more preferably C$_1$ or C$_3$ alkylene;

each R$^{12}$ is independently selected from the group consisting of hydrogen, halogen, amino, a substituted or unsubstituted alkyl, alkenyl, alkynyl, cycloaliphatic, aryl, heteroaryl, and heteroalicyclic group or a combination thereof;

each R$^{13}$ is independently selected from the group consisting of a substituted or unsubstituted alkyl, alkenyl, alkynyl, or acyl group, preferably ethyl; q independently stands for 0, 1, or 2; and B is a nitrogen-containing group selected from the group of formula (6), (7), (8) or (9)

$$-N=C(R^{14})_2 \quad (6)$$

$$-NR^{14a}-CR^{14b}=C(R^{14c})_2 \quad (7)$$

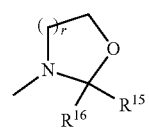 (8)

$$-NR^{17}R^{18} \quad (9)$$

wherein each R$^{14}$, R$^{14a}$, R$^{14b}$, R$^{14c}$, R$^{15}$ and R$^{16}$ is independently selected from the group consisting of hydrogen, a substituted or unsubstituted alkyl, alkenyl, alkynyl, cycloaliphatic, aryl, heteroaryl, and heteroalicyclic group or a combination thereof;

r is 1, 2, 3 or 4;

R$^{17}$ is selected from —Si(R$^{19}$)$_3$;

R$^{18}$ is selected from —Si(R$^{19}$)$_3$, hydrogen, a substituted or unsubstituted alkyl, alkenyl, alkynyl, cycloaliphatic, aryl, heteroaryl, and heteroalicyclic group or a combination thereof; and each R$^{19}$ is independently selected from hydrogen, a substituted or unsubstituted alkyl, alkenyl, alkynyl, cycloaliphatic, or aryl group or a combination thereof; or wherein R$^{17}$ and R$^{18}$ combine to form together with the nitrogen atom to which they are attached a group of formula —Si(R$^{19}$)$_2$—C$_{2-3}$ alkylene-Si(R$^{19}$)$_2$—.

The terms "blocked" and "capped" in relation to the compound of formula (II) are used interchangeably herein. Furthermore, the compound of formula (II) is herein referred to as a blocked/capped adhesion promoter. "Blocked", as used herein in connection with the compounds of formula (II), refers to the fact that said compounds are derivatized such that the active compound is only released upon contact with water and/or oxygen.

In various embodiments, in formula (6) one R$^{14}$ is hydrogen or methyl, preferably hydrogen, and the other R$^{14}$ is an unsubstituted alkyl group having 1 to 10 carbon atoms, preferably having 1 to 4 carbon atoms, such as, for example, isobutyl or methyl, or an unsubstituted aryl group, preferably phenyl.

In various embodiments, in formula (7) R$^{14a}$ and R$^{14b}$ and one R$^{14c}$ are hydrogen or methyl, preferably hydrogen, and the other R$^{14c}$ is an unsubstituted alkyl group having 1 to 10 carbon atoms, preferably having 1 to 4 carbon atoms, or an unsubstituted aryl group, preferably phenyl.

In various embodiments, R$^{15}$ and R$^{16}$ in formula (8) are hydrogen. In other embodiments, one is hydrogen and the other is alkyl, preferably C$_1$-C$_{10}$ alkyl, such as 3-heptyl or 2-propyl, aryl or alkylaryl with up to 15 carbon atoms, such as 2-(1-(4-tert-butyl-phenyl)propyl. In another embodiment, R$^{15}$ and R$^{16}$ in formula (8) are both not hydrogen and may preferably be selected from the afore-mentioned groups.

In formula (8), r is preferably 1 or 2, more preferably 1.

In formula (9), R$^{17}$ is —Si(R$^{19}$)$_3$ and each R$^{19}$ is preferably independently hydrogen, unsubstituted alkyl, more preferably C$_{1-4}$ alkyl, such as ethyl or methyl, or alkylene, such as vinyl. R$^{18}$ is preferably hydrogen, alkyl, such as propylene or methylene, substituted with —Si(R$^{19}$)$_3$, or —Si(R$^{19}$)$_3$, preferably —Si(R$^{19}$)$_3$, with each R$^{19}$ independently being unsubstituted alkyl, preferably methyl or ethyl, more preferably methyl, or, alternatively, alkylene, such as vinyl. Generally, if one R$^{19}$ is hydrogen, the other R$^{19}$ groups are preferably not hydrogen. Preferred groups for R$^{17}$ include, but are not limited to, —SiH(CH$_3$)$_2$, —Si(CH$_3$)$_2$(CH=CH)$_2$, —Si(CH$_3$)$_2$(C$_6$H$_5$), and —Si(CH$_3$)$_3$. In such embodiments, q may be 0 or 1, R$^{11}$ may be propylene, and R$^{12}$, if present, may be methyl and R$^{13}$ may be methyl or ethyl, preferably ethyl.

In other preferred embodiments, R$^{17}$ and R$^{18}$ combine to form together with the nitrogen atom to which they are attached a group of formula —Si(R$^{19}$)$_2$—C$_{2-3}$ alkylene-Si(R$^{19}$)$_2$—, in particular —Si(R$^{19}$)$_2$—(CH$_2$)$_2$—Si(R$^{19}$)$_2$—, with R$^{19}$ being unsubstituted alkyl, preferably methyl or ethyl, more preferably methyl, or, alternatively, vinyl.

In various embodiments, the capped adhesion promoter is a ketimine of formula (II) with q being 0, R$^{11}$ being methylene or propylene, preferably propylene, each R$^{13}$ being ethyl and B being a group of formula (6), wherein
(i) one R$^{14}$ is methyl and the second R$^{14}$ is isobutyl or methyl; or
(ii) one R$^{14}$ is hydrogen and the second R$^{14}$ is phenyl.

In various other embodiments, the capped adhesion promoter is a silazane of formula (II) with q being 0, R$^{11}$ being methylene or propylene, preferably propylene, each R$^{13}$ being ethyl or methyl, preferably ethyl, and B being a group of formula (9), wherein R$^{17}$ is —Si(R$^{19}$)$_3$ and R$^{18}$ is hydrogen, alkyl substituted with —Si(R$^{19}$)$_3$, or —Si(R$^{19}$)$_3$, preferably —Si(R$^{19}$)$_3$, and each R$^{19}$ is independently alkyl, preferably methyl or ethyl, more preferably methyl. In various alternative embodiments, at least one R$^{19}$ can be alkylene, preferably vinyl.

The curable compositions contain the capped adhesion promoter preferably in an amount of about 0.1 to about 5% by weight, preferably 0.3 to 2% by weight, based in each case on the total weight of the composition. If a mixture of capped adhesion promoters is used, the amounts refer to the total amount of such capped adhesion promoters in the composition.

In various embodiments, the adhesion promoter does not contain methoxy groups. It may be preferred that all alkoxy groups in the adhesion promoter are ethoxy groups.

In various embodiments, the amount of non-capped adhesion promoters may be minimized, in particular if the catalyst used for endcapping of the polyorganosiloxane is a capped catalyst, since it remains in the polymer composition and already acts as an adhesion promoter. In contrast to conventional aminosilanes, such capped adhesion promoters and catalysts are less susceptible to side reactions. The present invention thus encompasses embodiments in which no additional adhesion promoters besides capped catalysts of formula (Id) and the capped adhesion promoter of formula (II) are added.

The curable compositions may optionally also comprise as component (C) at least one curing catalyst.

In various embodiments, the curing catalyst may be a tin compound, preferably an organotin compound or an inorganic tin salt. Tin in these tin compounds is preferably bivalent or tetravalent. Component (C) is added to the composition particularly as a crosslinking catalyst. Suitable inorganic tin salts are, for example, tin(II) chloride and tin(IV) chloride. Organotin compounds (tin organyles) are used preferably as the tin compounds, however. Suitable organotin compounds are, for example, the 1,3-dicarbonyl compounds of bivalent or tetravalent tin, for example, the acetylacetonates such as di(n-butyl)tin(IV) di(acetylacetonate), di(n-octyl)tin(IV) di(acetylacetonate), (n-octyl)(n-butyl)tin(IV) di(acetylacetonate); the dialkyl tin(IV) dicarboxylates, for example, di-n-butyltin dilaurate, di-n-butyltin maleate, di-n-butyltin diacetate, di-n-octyltin dilaurate, di-n-octyltin diacetate, or the corresponding dialkoxylates, for example, di-n-butyltin dimethoxide; oxides of tetravalent tin, for example, dialkyltin oxides, such as, for example, di-n-butyltin oxide and di-n-octyltin oxide; and the tin(II) carboxylates such as tin(II) octoate or tin(II) phenolate.

Suitable furthermore are tin compounds of ethyl silicate, dimethyl maleate, diethyl maleate, dioctyl maleate, dimethyl phthalate, diethyl phthalate, dioctyl phthalate, such as, for example, di(n-butyl)tin(IV) di(methyl maleate), di(n-butyl)tin(IV) di(butyl maleate), di(n-octyl)tin(IV) di(methyl maleate), di(n-octyl)tin(IV) di(butyl maleate), di(n-octyl)tin (IV) di(isooctyl maleate); and di(n-butyl)tin(IV) sulfide, (n-butyl)$_2$Sn(SCH$_2$COO), (n-octyl)$_2$Sn(SCH$_2$COO), (n-octyl)$_2$Sn(SCH$_2$CH$_2$COO), (n-octyl)$_2$Sn(SCH$_2$CH$_2$COOCH$_2$CH$_2$OCOCH$_2$S), (n-butyl)$_2$-Sn(SCH$_2$COO-i-C$_8$H$_{17}$)$_2$, (n-octyl)$_2$Sn(SCH$_2$COO-i-C$_8$H$_{17}$)$_2$, and (n-octyl)$_2$Sn (SCH$_2$COO-n-C$_8$H$_{17}$)$_2$.

Preferably, the tin compound is selected from 1,3-dicarbonyl compounds of bivalent or tetravalent tin, the dialkyltin (IV) dicarboxylates, the dialkyltin(IV) dialkoxylates, the dialkyltin(IV) oxides, the tin(II) carboxylates, and mixtures thereof.

Particularly preferably, the tin compound is a dialkyltin (IV) dicarboxylate, particularly di-n-butyltin dilaurate or di-n-octyltin dilaurate.

Additionally or alternatively, other metal-based condensation catalysts may be used, including, without limitation, compounds of titanium such as organotitanates or chelate complexes, cerium compounds, zirconium compounds, molybdenum compounds, manganese compounds, copper compounds, aluminum compounds, or zinc compounds or their salts, alkoxylates, chelate complexes, or catalytically active compounds of the main groups or salts of bismuth, lithium, strontium, or boron.

Further suitable (tin-free) curing catalysts are, for example, organometallic compounds of iron, particularly the 1,3-dicarbonyl compounds of iron such as, e.g., iron(III) acetylacetonate.

Boron halides such as boron trifluoride, boron trichloride, boron tribromide, boron triiodide, or mixtures of boron halides can also be used as curing catalysts. Particularly preferred are boron trifluoride complexes such as, e.g., boron trifluoride diethyl etherate, which as liquids are easier to handle than gaseous boron halides.

Further, amines, nitrogen heterocycles, and guanidine derivatives are suitable in general for catalysis. An especially suitable catalyst from this group is 1,8-diazabicyclo [5.4.0]undec-7-ene (DBU).

Titanium, aluminum, and zirconium compounds, or mixtures of one or more catalysts from one or more of the just mentioned groups may also be used as catalysts.

Suitable as titanium catalysts are compounds that have hydroxy groups and/or substituted or unsubstituted alkoxy groups, therefore titanium alkoxides of the general formula

Ti(OR$^z$)$_4$, where R$^z$ is an organic group, preferably a substituted or unsubstituted hydrocarbon group having 1 to 20 C atoms, and the 4 alkoxy groups —OR$^z$ are identical or different. Further, one or more of the —OR$^z$ groups can be replaced by acyloxy groups —OCOR$^z$.

Likewise suitable as titanium catalysts are titanium alkoxides in which one or more alkoxy groups are replaced by a hydroxy group or halogen atoms.

Further, titanium chelate complexes can be used.

Aluminum catalysts can also be used as curing catalysts, e.g., aluminum alkoxides

Al(OR$^z$)$_3$, where R$^z$ has the above meaning; i.e., it is an organic group, preferably a substituted or unsubstituted hydrocarbon group having 1 to 20 C atoms and the three R$^z$ groups are identical or different. In the case of aluminum alkoxides as well, one or more of the alkoxy groups can be replaced by acyloxy groups —OC(O)R$^z$.

Further, aluminum alkoxides can be used in which one or more alkoxy groups are replaced by a hydroxy group or halogen atoms.

Of the described aluminum catalysts, the pure aluminum alcoholates are preferred in regard to their stability to moisture and the curability of the mixtures to which they are added. In addition, aluminum chelate complexes are preferred.

Suitable as zirconium catalysts are, e.g.: tetramethoxyzirconium or tetraethoxyzirconium.

Diisopropoxyzirconium bis(ethyl acetoacetate), triisopropoxyzirconium (ethyl acetoacetate), and isopropoxyzirconium tris(ethyl acetoacetate) are used with very particular preference.

Further, zirconium acylates can be used, for example.

Halogenated zirconium catalysts can also be used.

Further, zirconium chelate complexes can also be used.

In addition, carboxylic acid salts of metals or also a mixture of a number of such salts can be employed as curing catalysts, whereby these are selected from the carboxylates of the following metals: calcium, vanadium, iron, zinc, titanium, potassium, barium, manganese, nickel, cobalt, and/or zirconium.

Of the carboxylates, the calcium, vanadium, iron, zinc, titanium, potassium, barium, manganese, and zirconium carboxylates are preferred, because they exhibit a high activity. Calcium, vanadium, iron, zinc, titanium, and zirconium carboxylates are particularly preferred. Iron and titanium carboxylates are very particularly preferred.

The curable compositions contain the curing catalyst preferably in an amount of from about 0.05 to 2% by weight, preferably 0.1 to 1.5% by weight, based in each case on the total weight of the composition. If a mixture of different catalysts is used, the amounts refer to the total amount in the composition.

The compositions of the invention crosslink in the presence of moisture and in so doing cure with the formation of Si—O—Si bonds.

The molar ratio of the capped adhesion promoter and tin compound may, in various embodiments, be adjusted that it is at least 1:1, for example in the range of 1:1 to 50:1. This may help to assure that the curable composition, on the one hand, has very high storage stability and, on the other, cures reliably and at a sufficient rate after application in the presence of atmospheric moisture even at room temperature) (23° ° C.

The curable compositions can contain, apart from the components (A), (B) and (C), one or more components that can be used to selectively influence specific properties of the curable composition and/or the cured product.

These other components can be selected, for example, from the group comprising plasticizers, stabilizers, antioxidants, fillers, reactive diluents, drying agents, UV stabilizers, rheological aids, and/or solvents. Of particular importance are typically plasticizers, fillers, and stabilizers, comprising antioxidants and UV stabilizers.

Preferably, the curable compositions therefore contain at least one further component.

It is conceivable that the viscosity of the curable composition is too high for certain applications. It can then be reduced in a simple and expedient way usually by using a reactive diluent, without any signs of demixing (e.g., plasticizer migration) occurring in the cured mass.

Preferably, the reactive diluent has at least one functional group which after application reacts, e.g., with moisture or atmospheric oxygen. Examples of groups of this type are silyl groups, isocyanate groups, vinylically unsaturated groups, and polyunsaturated systems.

All compounds that can be mixed with the other components with a reduction in viscosity and have at least one group reactive with the polymer can be used as reactive diluents.

The viscosity of the reactive diluent is preferably less than 20,000 mPas, particularly preferably about 0.1 to 6000 mPas, very particularly preferably 1 to 1000 mPas (Brookfield RVT, 23° C., spindle 7, 10 rpm).

The following substances, for example, can be used as reactive diluents: polyalkylene glycols reacted with isocyanatosilanes (e.g., Synalox 100-50B, DOW), carbamatopropyltrimethoxysilane, alkyltrimethoxysilane, alkyltriethoxysilane, such as methyltrimethoxysilane, methyltriethoxysilane, and vinyltrimethoxysilane (XL 10, Wacker), vinyltriethoxysilane, phenyltrimethoxysilane, phenyltriethoxysilane, octyltrimethoxysilane, tetraethoxysilane, vinyldimethoxymethylsilane (XL12, Wacker), vinyltriethoxysilane (GF56, Wacker), vinyltriacetoxysilane (GF62, Wacker), isooctyltrimethoxysilane (IO Trimethoxy), isooctyltriethoxysilane (IO Triethoxy, Wacker), N-trimethoxysilylmethyl-O-methyl carbamate (XL63, Wacker), N-dimethoxy(methyl)silylmethyl-O-methyl carbamate (XL65, Wacker), hexadecyltrimethoxysilane, 3-octanoylthio-1-propyltriethoxysilane, and partial hydrolysates of said compounds.

Further, the following polymers from Kaneka Corp. can also be used as reactive diluents: MS S203H, MS S303H, MS SAT 010, and MS SAX 350.

Silane-modified polyethers which derive, e.g., from the reaction of isocyanatosilane with Synalox types can likewise be used.

Polymers that can be prepared from an organic framework by grafting with a vinylsilane or by reacting polyol, polyisocyanate, and alkoxysilane can be used, furthermore, as reactive diluents.

A polyol is understood to be a compound that may contain one or more OH groups in the molecule. The OH groups can be both primary and secondary.

Suitable aliphatic alcohols include, for example, ethylene glycol, propylene glycol, and higher glycols, as well as other polyfunctional alcohols. The polyols can contain in addition other functional groups such as. e.g., esters, carbonates, or amides.

To prepare the preferred reactive diluents, the corresponding polyol component is reacted in each case with an at least difunctional isocyanate. Any isocyanate having at least two isocyanate groups may basically be used as the at least difunctional isocyanate, but within the scope of the present invention, compounds with two to four isocyanate groups, particularly with two isocyanate groups, are generally preferred.

Preferably, the compound present as the reactive diluent has at least one alkoxysilyl group, whereby of the alkoxysilyl groups, the di- and trialkoxysilyl groups are preferred.

Suitable as polyisocyanates for the preparation of a reactive diluent are, for example, ethylene diisocyanate, 1,4-tetramethylene diisocyanate, 1,4-tetramethoxybutane diisocyanate, 1,6-hexamethylene diisocyanate (HDI), cyclobutane-1,3-diisocyanate, cyclohexane-1,3 and -1,4 diisocyanate, bis(2-isocyanatoethyl) fumarate, as well as mixtures of two or more thereof, 1-isocyanato-3,3,5-trimethyl-5-isocyanatomethyl cyclohexane (isophorone diisocyanate, IPDI), 2,4- and 2,6-hexahydrotoluylene diisocyanate, hexahydro-1,3- or -1,4-phenylene diisocyanate, benzidine diisocyanate, naphthalene-1,5-diisocyanate, 1,6-diisocyanato-2,2,4-trimethylhexane, 1,6-diisocyanato-2,4,4-trimethylhexane, xylylene diisocyanate (XDI), tetramethylxylylene diisocyanate (TMXDI), 1,3- and 1,4-phenylene diisocyanate, 2,4- or 2,6-toluylene diisocyanate (TDI), 2,4'-diphenylmethane diisocyanate, 2,2'-diphenylmethane diisocyanate, or 4,4'-diphenylmethane diisocyanate (MDI), or the partially or completely hydrogenated cycloalkyl derivatives thereof, for example, completely hydrogenated MDI (H12-MDI), alkyl-substituted diphenylmethane diisocyanates, for example, mono-, di-, tri-, or tetraalkyl diphenylmethane diisocyanate and the partially or completely hydrogenated cycloalkyl derivatives thereof, 4,4'-diisocyanatophenyl perfluoroethane, phthalic acid bis-isocyanatoethyl ester, 1-chloromethylphenyl-2,4- or -2,6-diisocyanate, 1-bromomethylphenyl-2,4- or -2,6-diisocyanate, 3,3-bis-chloromethyl ether-4,4'-diphenyl diisocyanate, sulfur-containing diisocyanates, as can be obtained by reacting 2 mol of diisocyanate with 1 mol of thiodiglycol or dihydroxydihexyl sulfide, the di- and triisocyanates of dimer and trimer fatty acids, or mixtures of two or more of the aforesaid diisocyanates.

Trivalent or higher valent isocyanates, as can be obtained, for example, by oligomerization of diisocyanates, particularly by oligomerization of the aforesaid isocyanates, can also be used as polyisocyanates. Examples of such trivalent and higher-valent polyisocyanates are the triisocyanurates of HDI or IPDI or mixtures thereof or mixed triisocyanurates thereof, as well as polyphenylmethylene polyisocyanate, as can be obtained by phosgenation of aniline-formaldehyde condensation products.

Solvents and/or plasticizers can be used, in addition to or instead of a reactive diluent, for reducing the viscosity of the curable composition.

Suitable as solvents are aliphatic or aromatic hydrocarbons, halogenated hydrocarbons, ketones, ethers, esters, ester alcohols, keto alcohols, keto ethers, keto esters, and ether esters.

The composition described herein can furthermore contain hydrophilic plasticizers. These are used to improve the moisture absorption and thereby to improve the reactivity at low temperatures. Suitable as plasticizers are, for example, esters of abietic acid, adipic acid esters, azelaic acid esters, benzoic acid esters, butyric acid esters, acetic acid esters, esters of higher fatty acids having approximately 8 to approximately 44 carbon atoms, epoxidized fatty acids, fatty acid esters and fats, glycolic acid esters, phosphoric acid esters, phthalic acid esters, linear or branched alcohols containing 1 to 12 carbon atoms, propionic acid esters, sebacic acid esters, sulfonic acid esters, thiobutyric acid esters, trimellitic acid esters, citric acid esters, and esters based on nitrocellulose and polyvinyl acetate, as well as mixtures of two or more thereof.

For example, of the phthalic acid esters, dioctyl phthalate, dibutyl phthalate, diisoundecyl phthalate, or butylbenzyl phthalate is suitable, and of the adipates, dioctyl adipate, diisodecyl adipate, diisodecyl succinate, dibutyl sebacate, or butyl oleate.

Also suitable as plasticizers are the pure or mixed ethers of monofunctional, linear or branched $C_{4-16}$ alcohols or mixtures of two or more different ethers of such alcohols, for example, dioctyl ether (obtainable as Cetiol OE, Cognis Deutschland GmbH, Düsseldorf).

Endcapped polyethylene glycols are also suitable as plasticizers, for example, polyethylene or polypropylene glycol di-$C_{1-4}$-alkyl ethers, particularly the dimethyl or diethyl ethers of diethylene glycol or dipropylene glycol, and mixtures of two or more thereof.

Suitable plasticizers are endcapped polyethylene glycols, such as polyethylene or polypropylene glycol dialkyl ethers, where the alkyl group has up to four C atoms, and particularly the dimethyl and diethyl ethers of diethylene glycol and dipropylene glycol. An acceptable curing is achieved in particular with dimethyldiethylene glycol also under less favorable application conditions (low humidity, low temperature). Reference is made to the relevant technical chemistry literature for further details on plasticizers.

Also suitable as plasticizers are diurethanes, which can be prepared, for example, by reacting diols, having OH end groups, with monofunctional isocyanates, by selecting the stoichiometry such that substantially all free OH groups react. Optionally excess isocyanate can then be removed from the reaction mixture, for example, by distillation. A further method for preparing diurethanes consists of reacting monofunctional alcohols with diisocyanates, whereby all NCO groups are reacted if possible.

In various embodiments, the plasticizer may be a polydimethylsiloxane different from (A), particularly a PDMS that does not have terminal groups of formula (I).

In various embodiments, the curable composition comprises at least one plasticizer, for example a polydimethylsiloxane.

The curable compositions contain the plasticizer preferably in an amount of 1 to 50% by weight, preferably in an amount of 10 to 40% by weight, particularly preferably in an amount of 20 to 30% by weight, based in each case on the total weight of the composition. If a mixture of plasticizers is used, the amounts refer to the total amount of plasticizers in the composition.

Preferably, the curable composition contains at least one stabilizer, selected from antioxidants, UV stabilizers, and drying agents.

All conventional antioxidants may be used as antioxidants. They are preferably present up to about 7% by weight, particularly up to about 5% by weight.

The composition herein can contain UV stabilizers, which are preferably used up to about 2% by weight, preferably about 1% by weight. The so-called hindered amine light stabilizers (HALS) are particularly suitable as UV stabilizers. It is preferred within the context of the present invention if a UV stabilizer is employed, which carries a silyl group and is incorporated into the end product during crosslinking or curing. The products Lowilite 75 and Lowilite 77 (Great Lakes, USA) are particularly suitable for this purpose. Further, benzotriazoles, benzophenones, benzoates, cyanoacrylates, acrylates, sterically hindered phenols, phosphorus, and/or sulfur can also be added.

It is often useful to stabilize the compositions in regard to penetrating moisture by means of drying agents in order to increase the storability (shelf life) still further.

Such an improvement in storability can be achieved, for example, by using drying agents. All compounds that react with water with the formation of a group inert to the reactive groups present in the preparation are suitable as drying agents and thereby undergo the smallest possible changes in their molecular weight. Furthermore, the reactivity of the drying agents to moisture penetrating into the preparation must be higher than the reactivity of the groups of the silyl group-bearing polymer of the invention present in the preparation Isocyanates, for example, are suitable as drying agents.

Advantageously, however, silanes are used as drying agents. For example, vinylsilanes such as 3-vinylpropyltriethoxysilane, oxime silanes such as methyl-O,O', O''-butan-2-one-trioximosilane or O,O',O'', O'''-butan-2-one-tetraoximosilane (CAS Nos. 022984-54-9 and 034206-40-1) or benzamidosilanes such as bis(N-methylbenzamido)methylethoxysilane (CAS No. 16230-35-6) or carbamatosilanes such as carbamatomethyltrimethoxysilane. The use of methyl-, ethyl-, or vinyltrimethoxysilane, tetramethyl- or tetraethylethoxysilane is also possible. Vinyltrimethoxysilane and tetraethoxysilane are particularly suitable in terms of cost and efficiency.

Also suitable as drying agents are the aforesaid reactive diluents, provided they have a molecular weight ($M_n$) of less than about 5000 g/mol and have end groups whose reactivity to penetrated moisture is at least as high as, preferably higher than, the reactivity of the reactive groups of the polymer used according to the invention.

Lastly, alkyl orthoformates or alkyl orthoacetates can also be used as drying agents, for example, methyl or ethyl orthoformate or methyl or ethyl orthoacetate.

The compositions generally contain about 0 to about 6% by weight of drying agent.

The composition described herein can additionally contain fillers. Suitable here are, for example, chalk, lime powder, precipitated and/or pyrogenic (fumed) silica, zeolites, bentonites, magnesium carbonate, diatomaceous earth, alumina, clay, tallow, titanium oxide, iron oxide, zinc oxide, sand, quartz, flint, mica, glass powder, and other ground mineral substances. Organic fillers can also be used, such as, for example, carbon black, graphite, wood fibers, wood flour, sawdust, cellulose, cotton, pulp, cotton, wood chips, chopped straw, and chaff. Short fibers such as glass fibers, glass filament, polyacrylonitrile, carbon fibers, Kevlar fibers, or polyethylene fibers may also be added. Aluminum powder is also suitable as a filler.

The pyrogenic (fumed) and/or precipitated silica preferably have a BET surface area of 10 to 90 m²/g. When they are used, they do not cause any additional increase in the viscosity of the composition of the invention, but contribute to strengthening the cured composition.

It is likewise conceivable to use pyrogenic and/or precipitated silica with a higher BET surface area, advantageously with 100 to 250 m²/g, particularly 110 to 170 m²/g, as a filler. Because of the higher BET surface area, the same effect, e.g., strengthening of the cured preparation, can be achieved at a smaller weight proportion of silicic acid. Further substances can thus be used to improve the composition described herein in terms of other requirements.

Suitable further as fillers are hollow spheres having a mineral shell or a plastic shell. These can be, for example, hollow glass spheres which are obtainable commercially under the trade names Glass Bubbles®. Plastic-based hollow spheres, e.g., Expancel® or Dualite®, are described, for example, in EP 0 520 426 B1. They are made up of inorganic or organic substances and each have a diameter of 1 mm or less, preferably 500 μm or less.

Fillers that impart thixotropy to the preparations are preferred for many applications. Such fillers are also described as rheological adjuvants, e.g., hydrogenated castor oil, fatty acid amides, or swellable plastics such as PVC. In order to be readily squeezable out of a suitable dispensing device (e.g., a tube), such preparations possess a viscosity from 3000 to 15,000, preferably 40,000 to 80,000 mPas, or even 50,000 to 60,000 mPas.

The fillers are preferably used in an amount of 1 to 80% by weight, particularly preferably 2 to 20% by weight, and very particularly preferably 5 to 10% by weight, based in each case on the total weight of the composition. Of course, mixtures of a number of fillers can also be used. In this case, the quantitative data naturally refer to the total amount of filler in the composition.

In various embodiments, in the polyorganosiloxane and/or the curable compositions of the invention the number of methoxysilane groups, i.e. the silane groups that comprise at least one methoxy group coupled directly to the silicon atom, in the polyorganosiloxane/curable composition relative to the total number of silane groups is less than 5 mol-%, preferably less than 4 mol-%. In various embodiments, this limitation relates to the combined components (A) and (B) but does not include other components that may be additionally present.

In various embodiments, the amount of compounds that comprise methoxysilane groups in the curable composition is less than 2 wt.-% relative to the total weight of the composition, preferably less than 1 wt.-%, more preferably about 0.5 wt.-% or less. In various embodiments, this limitation relates to the combined components (A) and (B) but does not include other components that may be additionally present.

In various embodiments, the amount of methanol relative to the total amount of volatile alcohols that are or would be released by complete hydrolysis of the silane groups is less than 15 mol %, preferably less than 10 mol %, more preferably less than 5 mol %. In various embodiments, this limitation relates to the polyorganosiloxane of the invention, combined components (A) and (B) of the curable composition but not other components that may be additionally present in the composition, or the total curable composition.

The preparation of the curable composition can take place by simple mixing of the polyorganosiloxane (A) and the other ingredients, such as the adhesion promoter, the catalyst and any further components. This can take place in suitable dispersing units, e.g., a high-speed mixer. In this case, preferably, care is taken that the mixture does not come into contact with moisture as far as possible, which could lead to an undesirable premature curing. Suitable measures are sufficiently known and comprise, for example, working in an inert atmosphere, possibly under a protective gas, and drying/heating of individual components before they are added.

The compositions of the invention can be used as an adhesive or sealing or coating material.

The composition can be used, for example, as an adhesive, sealant, coating, and for the production of molded parts. A further field of application for the compositions is the use as a plugging compound, hole filler, or crack filler. The use as a sealant is preferred.

The compositions are suitable, inter alia, for bonding plastics, metals, glass, ceramic, wood, wood-based materials, paper, paper-based materials, rubber, and textiles, for gluing floors, and for sealing building elements, windows, wall and floor coverings, and joints in general. In this case, the materials can be bonded to themselves or as desired to one another.

The following examples serve to explain the invention, but the invention is not limited thereto.

EXAMPLES

Example 1

The comparison compositions C1a and C1b and the compositions E1a and E1b according to the invention were prepared by mixing the raw materials 1-5 listed in Table 1. Compositions C1a and E1a were then directly mixed with the remaining materials 6-9, while compositions C1b and E1b were incubated for 72 h before mixing with materials 6-9. The formulations additionally differ in the type of the crosslinking (capping) catalyst, crosslinking agent, curing catalyst and adhesion promoter used.

TABLE 1

| | Raw materials | E1a Parts by weight | E1b Parts by weight | C1a Parts by weight | C1b Parts by weight |
|---|---|---|---|---|---|
| 1 | α,ω-Dihydroxy-terminated polydimethylsiloxane with a viscosity of 80,000 cST | 52.70 | 52.70 | 52.72 | 52.72 |
| 2 | Vinyl tris(ethyl lactato)silane | 2.48 | 2.48 | 2.48 | 2.48 |
| 3a | Triethoxyvinylsilane | 2.48 | 2.48 | | |
| 3b | Trimethoxyvinylsilane | | | 2.48 | 2.48 |
| 4 | Plasticizer (α,ω-Dimethyl-terminated Polydimethylsiloxane with a viscosity of 1,000 cST) | 33.15 | 33.15 | 33.39 | 33.39 |
| 5a | Ketimine 1 (capping catalyst) | 0.67 | 0.67 | | |
| 5b | 3-aminopropyltrimethoxysilane (capping catalyst) | | | 0.40 | 0.40 |
| 6 | Highly dispersed silicic acid | 7.35 | 7.35 | 7.35 | 7.35 |
| 7 | 3-(N,N-dimethylamino)propyltrimethoxysilane | 0.50 | 0.50 | 0.50 | 0.50 |
| 8a | 3-aminopropyltriethoxysilane | 0.50 | 0.50 | | |
| 8b | 3-aminopropyltrimethoxysilane | | | 0.50 | 0.50 |
| 9a | Dioctyltin dineodecanoate | 0.18 | | 0.18 | |
| 9b | Dioctyltin dilaurate (DOTL) | | 0.18 | | 0.18 |

Ketimine 1 is a compound of formula (II), wherein q is 0, $R^{11}$ is propylene, each $R^{13}$ is ethyl and B is a group of formula (6) wherein one $R^{14}$ is methyl and the second $R^{14}$ is isobutyl.

Polymer (A) was formed from the α,ω-Dihydroxy-terminated polydimethylsiloxane and the vinyl tris(ethyl lactato) silane/triethxyvinylsilane/trimethoxyvinylsilane in a previous step in the presence of either the 3-aminopropyltrimethoxysilane as a catalyst (C1a/C1b) or ketimine 1 as the catalyst (E1a/E1b) according to the following procedure:

Procedure for Preparation:

A mixer equipped with a mechanical stirrer, vacuum pump, nitrogen pipe and a thermometer was charged with a, w-hydroxyl-terminated polydimethylsiloxane (viscosity: 80000 mPas) and plasticizer. After degassing (vacuum for several minutes) the endcapping catalyst (see above) was added. After 3 minutes of stirring, vinyl tris(ethyl lactato) silane, triethoxyvinylsilane and trimethoxyvinylsilane, respectively, was added. The mixture was stirred for 5 minutes at room temperature under nitrogen and for 5 additional minutes under vacuum. Finally, fillers, adhesion promoters, possible additives and curing catalyst are either directly added or added after 72 h incubation following the usual procedure for silicone composition preparation.

The prepared formulations were subjected to curing performance tests as follows:

Determination of Skin-over time (SOT): Skin-over time (SOT) is defined as the time required for the material to form a non-tacky surface film. The determination of the skin over time is carried out according to DIN 50014 under standard climate conditions (23+/−2° C., relative humidity 50+/−5%). The temperature of the sealant must be 23+/−2° C., with the sealant stored for at least 24 h beforehand in the laboratory. The sealant is applied to a sheet of paper and spread out with a putty knife to form a skin (thickness about 2 mm, width about 7 cm). The stopwatch is started immediately. At intervals, the surface is touched lightly with the fingertip and the finger is pulled away, with sufficient pressure on the surface that an impression remains on the surface when the skin formation time is reached. The skin-over time is reached when sealing compound no longer adheres to the fingertip. The skin-over time (SOT) is expressed in minutes.

Measurement of Shore A hardness: Shore A hardness was measured according to ISO 868.

Determination of the depth of cure (DOC): A strip of the material with a height of 10 mm (+/−1 mm) and width of 20 mm (+/−2 mm) was applied over a plastic foil (PP) using a Teflon spatula. After storing the sample for 24 hours at normal conditions (23+/−2° C., relative humidity 50+/−5%), a section of the strip was cut off and the thickness of the cured layer was measured with a caliper. The depth of cure after 24 hours is expressed in millimeters.

Assessment of the mechanical properties (tensile test): The Tensile test determines the breaking force, elongation at break and yield stress value (e-module), according to DIN 53504. Deviation from the norm: dumbbell specimens with the following dimensions were used: thickness 2+/−0.2 mm; bar width 10+/−0.5 mm; bar length approx. 45 mm; total length 9 cm. The tests took place at normal conditions (23+/−2° C., relative humidity 50+/−5%). The measurement was carried out after 7 days of curing. Procedure: the prepolymer mixture (formulation) was spread on an even surface forming a film with a thickness of 2 mm. The film was allowed to cure under normal conditions (see above) for seven days, and then the dumbbell specimen was punched out. Three specimens were used for each determination. The test was carried out under normal conditions. The test specimens have to be at the same temperature at which the measurement will take place. Before the measurement, the thickness of the test specimens is determined at least at three different positions, at the middle and at the extremes, with a caliper. The mean value is introduced in the measuring software. The test specimens are clamped into the tensile tester so that the longitudinal axis coincides with the mechanical axis of the tensile tester and comprises the largest possible surface of the rod heads, without clamping the middle bar. Then the dumbbell is stretched to <0.1 MPa with a rate of 50 mm/min. Then, the force-elongation curve is recorded with a line speed of 50 mm/min. Evaluation: The following values are determined: breaking force in [N/mm$^2$] elongation at break in [%] and modulus at 100% elongation in [N/mm$^2$].

Peel Test:

If possible and needed, substrate (test panel) is cleaned prior to application using a suitable solvent. A strip of the material with a height of 10 mm (+/−1 mm) and width of 20 mm (+/−2 mm) was applied over the substrate using a Teflon spatula. The sample was stored for 7 days at normal conditions (23+/−2° C., relative humidity 50+/−5%). The cured material was cut back for at least 15 mm with a shape blade and the bead pulled by hand. Failure mode was recorded as following:

✓ ⇔Cohesion failure (CF) or alternatively cohesive/adhesive failure
~ ⇔Adhesion failure (AF) with "strong resistance"
x ⇔Adhesion failure.
n.d.=not determined

TABLE 3

Properties of compositions prior to storage (directly after mixing)

|  | E1a | E1b | C1a | C1b |
|---|---|---|---|---|
| SOT (min) | 11 | 13 | 8 | 17 |
| Shore A 1 d | 10 | 12 | 8 | 7 |
| Shore A 7 d | 20 | 18 | 20 | 20 |
| cure through (mm in 24 h) | 2.86 | 2.78 | 2.56 | 2.46 |
| tack free after 24 h | OK | OK | OK | OK |
| ADHESION |  |  |  |  |
| PMMA | ✓ | ✓ | x | x |
| Aluminum/Elox | ✓ | ✓ | ✓ | ✓ |
| Brass | ✓ | ✓ | ✓ | ✓ |
| Glass | ✓ | ✓ | ✓ | ✓ |
| Concrete | ✓ | ✓ | ✓ | x |
| Modulus at 100% | 0.33 | 0.32 | 0.33 | 0.37 |
| Elongation at break | 530.8 | 541.8 | 517.9 | 476.7 |

TABLE 4

Properties of compositions after storage (8 weeks; 40° C., 80% humidity)

|  | E1a | E1b | C1a | C1b |
|---|---|---|---|---|
| SOT (min) | 29 | 35 | 30 | 40 |
| Shore A 1 d | 2 | 2 | n.d. | 5 |
| Shore A 7 d | 15 | 15 | 16 | 18 |
| cure through (mm in 24 h) | 3.30 | 3.39 | n.d. | 3.03 |
| tack free 24 h | OK | OK | OK | OK |
| ADHESION |  |  |  |  |
| PMMA | ✓ | ✓ | x | x |
| Aluminum/Elox | ✓ | ✓ | ✓ | x |
| Brass | ✓ | ✓ | ✓ | x |
| Glass | ✓ | ✓ | ✓ | ✓ |
| Concrete | ✓ | x | x | x |
| Modulus at 100% | 0.26 | 0.26 | n.d. | 0.32 |
| Elongation at break | 532.2 | 587.3 | n.d. | 531.3 |

The results show that the compositions of the invention have a better adhesion compared to the comparative compositions and show high storage stability.

What is claimed is:

1. A polyorganosiloxane containing at least one terminal group of the formula (I):

$$-A-Si(R^1)_m(R^2)_n(R^3)_{3-(m+n)} \quad (I)$$

wherein:
A is a bond, —O— or a linear, branched or cyclic divalent group selected from hydrocarbon residues having 1 to 12 carbon atoms, alkylene, arylene, oxyalkylene, oxyarylene, siloxane-alkylene, siloxane-arylene, ester, amine, glycol, imide, amide, alcohol, carbonate, urethane, urea, sulfide, ether or a derivative or combination thereof;

each $R^1$ is independently selected from the group consisting of hydrogen, halogen, amino, oximino, a substituted or unsubstituted alkyl, alkenyl, alkenyloxy, alkynyl, alkylnyloxy, cycloaliphatic, cycloaliphatic-O—, aryl, aryloxy, heteroaryl, heteroaryloxy, heteroalicyclic, heteroalicyclicoxy, acyl, acyloxy group or a combination thereof;

each $R_2$ is independently a group of the general formula (2a) or (2b):

$$-O-Y-COOR^4 \quad (2a)$$

$$-O-(C_{2-4}\,Alkyl) \quad (2b)$$

wherein
Y is a substituted or unsubstituted (hetero)aromatic group having 4 to 14 ring atoms, a substituted or unsubstituted saturated or partially unsaturated 4- to 14-membered (hetero)cyclic group or —(C($R^5$)$_2$)$_o$—;

$R^4$ is a substituted or unsubstituted alkyl, alkenyl, alkynyl, cycloaliphatic, aryl, heteroaryl, and heteroalicyclic group or a combination thereof;
each $R^5$ is independently selected from the group consisting of hydrogen, a substituted or unsubstituted alkyl, alkenyl, alkynyl, cycloaliphatic or aryl group; and
o is an integer from 1 to 10; and
$C_{2-4}$ Alkyl is ethyl, propyl or butyl;

each $R^3$ independently is a group of the general formula (3):

$$-O-Y-CONR^6R^7 \quad (3)$$

wherein
Y is as defined above;
$R^6$ is selected from the group consisting of hydrogen, a substituted or unsubstituted alkyl, alkenyl, alkynyl cycloaliphatic, aryl, heteroaryl, and heteroalicyclic group or a combination thereof or $R^7$;
$R^7$ is a group of the general formula (4):

$$-R^8-SiR^9_p(OR^{10})_{3-p} \quad (4)$$

wherein
$R^8$ is an alkylene group, optionally interrupted by a heteroatom;
each $R^9$ is independently selected from the group consisting of hydrogen, halogen, amino, a substituted or unsubstituted alkyl, alkenyl, alkynyl, cycloaliphatic, aryl, heteroaryl, and heteroalicyclic group or a combination thereof;
each $R^{10}$ is independently selected from the group consisting of a substituted or unsubstituted alkyl, alkenyl, alkynyl, or acyl group;
each p independently stands for 0, 1 or 2;

m is independently 0, 1 or 2; and
n is independently 1, 2, or 3, wherein the sum n+m is a maximum of 3;
with the proviso that the polyorganosiloxane contains at least one terminal group of the formula (I) wherein at least one $R^2$ is a group of formula (2a) and at least one terminal group of the formula (I) wherein at least one $R^2$ is a group of formula (2b), wherein the at least one $R^2$ that is a group of formula (2a) and the at least one $R^2$ that is a group of formula (2b) can be the same or different;
wherein said polyorganosiloxane is the reaction product of a polyorganosiloxane (Ia) having at least one reactive group A' bound to a silicon atom with at least one compound of formula (Ib)

$$C^a-Si(R^1)_m(R^{2a})_n(R^3)_{3-(m+n)} \quad (Ib)$$

and at least one compound of formula (Ic)

$$C^b-Si(R^1)_m(R^{2b})_n \quad (Ic)$$

wherein $R^{2a}$ is a group of the general formula (2a) and $R^{2b}$ is a group of the general formula (2b), wherein the mass ratio of the compound of formula (Ib) and the compound of formula (Ic) is 95:5 to 5:95;
with $C^a$ and $C^b$ being a reactive group that reacts with the at least one reactive group A' bound to a silicon atom to yield the linking group -A-;
m is independently 0, 1 or 2;
n is independently 1, 2, or 3, wherein the sum n+m is a maximum of 3 for the compounds of formula (Ib) and is 3 for the compounds of formula (Ic);
optionally in the presence of a catalyst.

2. The polyorganosiloxane according to claim 1, wherein
(i) $C^a$ is a leaving group of the general formula (2a);
(ii) $C^b$ is a leaving group of the general formula (2b); and
(iii) A' is a nucleophilic group.

3. The polyorganosiloxane according to claim 1, wherein the catalyst is a compound of formula (Id)

$$D-R^{11}-SiR^{12}_q(OR^{13})_{3-q} \quad (Id)$$

wherein
$R^{11}$ is an alkylene group, optionally interrupted by a heteroatom;
each $R^{12}$ is independently selected from the group consisting of hydrogen, halogen, amino, a substituted or unsubstituted alkyl, alkenyl, alkynyl, cycloaliphatic, aryl, heteroaryl, and heteroalicyclic group or a combination thereof;
each $R^{13}$ is independently selected from the group consisting of a substituted or unsubstituted alkyl, alkenyl, alkynyl, or acyl group;
q independently stands for 0, 1, or 2; and
D is a nitrogen-containing group selected from the group of formula (Ie), (If) or (Ig)

$$-N=C(R^{14})_2 \quad (Ie)$$

$$-NR^{14a}-CR^{14b}=C(R^{14c})_2 \quad (If)$$

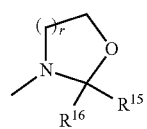
(Ig)

wherein each $R^{14}$ is independently selected from the group consisting of hydrogen, a substituted or unsubstituted alkyl, alkenyl, alkynyl, cycloaliphatic, aryl, heteroaryl, and heteroalicyclic group or a combination thereof;

each $R^{14a}$, $R^{14b}$, $R^{14c}$, $R^{15}$ and $R^{16}$ is independently selected from the group consisting of hydrogen, a substituted or unsubstituted alkyl, alkenyl, alkynyl, cycloaliphatic, aryl, heteroaryl, and heteroalicyclic group or a combination thereof; and r is 1, 2, 3 or 4.

4. The polyorganosiloxane according to claim 1, wherein
(i) the polyorganosiloxane is a polydimethylsiloxane (PDMS); and/or
(ii) A is a bond, —O— or a linear or branched divalent group of the formula —$(CH_2)_{1-10}$—$(Si(Alk)_2$-O-Si$(Alk)_2)_{1-10}$—$(CH_2)_{1-10}$, or a derivative thereof, with Alk being $C_{1-10}$ alkyl.

5. The polyorganosiloxane according to claim 1, wherein
(i) the sum of n+m is 3; and/or
(ii) n is 2 or 3; and/or
(iii) the polyorganosiloxane comprises
 (a) at least one terminal group of formula (I) with m being 0 and n being 3 or m being 1 and n being 2, wherein
  each $R^1$ independently of one another stands for an alkyl group having 1 to 10 carbon atoms, or an alkenyl group having 2 to 10 carbon atoms, or an aryl group having 6 to 10 carbon atoms, or an aryloxy group having 6 to 14 carbon atoms, or an acyloxy group having 2 to 10 carbon atoms, or an alkenyloxy having 2 to 10 carbon atoms, or amino; and
  at least one $R^2$ stands for a group of the formula (2a), wherein $R^4$ stands for a substituted or unsubstituted alkyl group having 1 to 10 carbon atoms, and Y is a substituted or unsubstituted aromatic group having 6 carbon ring atoms, or —$(C(R^5)_2)_o$—, wherein o is 1 and one of the $R^5$ groups is hydrogen and the second $R^5$ group is a substituted or unsubstituted alkyl group having 1 to 10 carbon atoms, or an (alkyl) ester thereof,
  wherein, if at least one $R^2$ stands for a group of formula (2b), said $R^2$ is ethoxy; and
 (b) at least one terminal group of formula (I) with m being 0 and n being 3 or m being 1 and n being 2, wherein
  each $R^1$ independently of one another stands for an alkyl group having 1 to 10 carbon atoms, or an alkenyl group having 2 to 10 carbon atoms, or an aryl group having 6 to 10 carbon atoms, or an aryloxy group having 6 to 14 carbon atoms, or an acyloxy group having 2 to 10 carbon atoms, or an alkenyloxy having 2 to 10 carbon atoms, or amino; and
  at least one $R^2$ stands for a group of the formula (2b), wherein, if at least one $R^2$ stands for a group of formula (2a), $R^4$ stands for a substituted or unsubstituted alkyl group having 1 to 10 carbon atoms, and Y is a substituted or unsubstituted aromatic group having 6 carbon ring atoms, or —$(C(R^5)_2)_o$—, wherein o is 1 and one of the $R^5$ groups is hydrogen and the second $R^5$ group is a substituted or unsubstituted alkyl group having 1 to 10 carbon atoms, or an (alkyl) ester thereof.

6. The polyorganosiloxane according to claim 1, comprising at least two terminal groups of formula (I) and the groups $Si(R^1)_m(R^2)_n(R^3)_{3-(m+n)}$ in the terminal groups of formula (I) comprise groups selected from
(i) methyl bis(ethyl lactato)silane, ethyl bis(ethyl lactato) silane, phenyl bis(ethyl lactato)silane, vinyl bis(ethyl lactato)silane, tri(ethyl lactato)silane, methyl bis(ethyl salicylato)silane, ethyl bis(ethyl salicylato)silane, phenyl bis(ethyl salicylato)silane, vinyl bis(ethyl salicylato)silane, tri(ethyl salicylato)silane, methyl bis(diethyl malato)silane, ethyl bis(diethyl malato)silane, phenyl bis(diethyl malato)silane, vinyl bis(diethyl malato)silane, tri(diethyl malato)silane and mixtures thereof; and
(ii) methyl diethoxysilane, ethyl diethoxysilane, phenyl diethoxysilane, vinyl diethoxysilane, triethoxysilane, and mixtures thereof; and
(iii) methyl ethyl lactate ethoxy silane, ethyl ethyl lactate ethoxy silane, phenyl ethyl lactate ethoxy silane, vinyl ethyl lactate ethoxy silane, bis(ethyl lactato) ethoxy silane, methyl ethyl salicylate ethoxy silane, ethyl ethyl salicylate ethoxy silane, phenyl ethyl salicylate ethoxy silane, vinyl ethyl salicylate ethoxy silane, bis(ethyl salicylato) ethoxy silane, methyl diethyl malato ethoxy silane, ethyl diethyl malato ethoxy silane, phenyl diethyl malato ethoxy silane, vinyl diethyl malato ethoxy silane, bis(diethyl malato) ethoxy silane and mixtures thereof.

7. Cured reaction products of the polyorganosiloxane according to claim 1.

8. A curable composition comprising (A) at least one polyorganosiloxane according to claim 1.

9. The curable composition according to claim 8, further comprising (B) at least one adhesion promoter.

10. The curable composition according to claim 8, further comprising (B) at least one adhesion promoter, wherein the (B) adhesion promoter is selected from the group consisting of aminosilanes or from capped adhesion promoters of formula (II):

$$B—R^{11}—SiR^{12}_q(OR^{13})_{3-q} \quad (II)$$

wherein
$R^{11}$ is an alkylene group, optionally interrupted by a heteroatom;
each $R^{12}$ is independently selected from the group consisting of hydrogen, halogen, amino, a substituted or unsubstituted alkyl, alkenyl, alkynyl, cycloaliphatic, aryl, heteroaryl, and heteroalicyclic group or a combination thereof;
each $R^{13}$ is independently selected from the group consisting of a substituted or unsubstituted alkyl, alkenyl, alkynyl, or acyl group;
q independently stands for 0, 1, or 2; and
B is a nitrogen-containing group selected from the group of formula (6), (7), (8), or (9)

$$—N{=}C(R^{14})_2 \quad (6)$$

$$—NR^{14a}—CR^{14b}{=}C(R^{14c})_2 \quad (7)$$

(8)

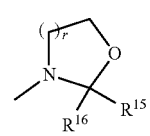

$$—NR^{17}R^{18} \quad (9)$$

wherein each $R^{14}$, $R^{14a}$, $R^{14b}$, $R^{14c}$, $R^{15}$ and $R^{16}$ is independently selected from the group consisting of hydrogen, a substituted or unsubstituted alkyl, alkenyl, alkynyl, cycloaliphatic, aryl, heteroaryl, and heteroalicyclic group or a combination thereof;

r is 1, 2, 3 or 4;

$R^{17}$ is selected from —Si$(R^{19})_3$;

$R^{18}$ is selected from —Si$(R^{19})_3$, hydrogen, a substituted or unsubstituted alkyl, alkenyl, alkynyl, cycloaliphatic, aryl, heteroaryl, and heteroalicyclic group or a combination thereof; and each $R^{19}$ is independently selected from hydrogen, a substituted or unsubstituted alkyl, alkenyl, alkynyl, cycloaliphatic, or aryl group or a combination thereof; or wherein $R^{17}$ and $R^{18}$ combine to form together with the nitrogen atom to which they are attached a group of formula —Si$(R^{19})_2$—$C_{2-3}$ alkylene-Si$(R^{19})_2$—.

11. The curable composition according to claim 10, further comprising (C) at least one curing catalyst; wherein
(i) the amount of (A) polyorganosiloxane is from about 32 to about 97% by weight, relative to the total weight of the composition; and/or
(ii) the amount of capped adhesion promoter (B) is from about 0.1 to about 5% by weight, relative to the total weight of the composition; and/or
(iii) the amount of the curing catalyst is from about 0.05 to 2% by weight, relative to the total weight of the composition; and/or
(iv) the curable composition essentially consists of (A), (B) and (C).

12. The curable composition according to claim 10, wherein the capped adhesion promoter is:

(a) a ketimine of formula (II) with q being 0, $R^{11}$ being methylene or propylene, each $R^{13}$ being ethyl or methyl, and B being a group of formula (6), wherein
(i) one $R^{14}$ is methyl and the second $R^{14}$ is isobutyl or methyl; or
(ii) one $R^{14}$ is hydrogen and the second $R^{14}$ is phenyl; or (b) a silane of formula (II) with q being 0, $R^{11}$ being methylene or propylene, each $R^{13}$ being ethyl or methyl, and B being a group of formula (9), wherein $R^{17}$ is —Si$(R^{19})_3$ and $R^{18}$ is hydrogen, alkyl substituted with —Si$(R^{19})_3$, or —Si$(R^{19})_3$, and each $R^{19}$ is independently alkyl.

13. The curable composition according to claim 8, further comprising (C) at least one curing catalyst.

14. The curable composition according to claim 8, further comprising (C) at least one curing catalyst selected from 1,3-dicarbonyl compounds of bivalent or tetravalent tin, dialyltin(IV) dicarboxylates, dialkyltin(IV) dialkoxylates, dialkyltin(IV) oxides, tin(II) carboxylates, and mixtures thereof.

15. The curable composition according to claim 8, wherein the curable composition further comprises one or more additional ingredients selected from the group consisting of plasticizers, fillers, bases, and adhesion promoters different from the capped adhesion promoter (B).

16. The curable composition according to claim 8, wherein the amount of methanol relative to the total amount of volatile alcohols that are released by complete hydrolysis of the silane groups is less than 15 mol %.

17. Cured reaction products of the curable composition according to claim 8.

* * * * *